United States Patent
Ueno

(10) Patent No.: US 7,319,463 B2
(45) Date of Patent: Jan. 15, 2008

(54) ELECTRONIC CAMERA APPARATUS AND IMAGE PROCESSING METHOD THEREOF

(75) Inventor: Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 870 days.

(21) Appl. No.: 10/657,750

(22) Filed: Sep. 8, 2003

(65) Prior Publication Data

US 2005/0174444 A1 Aug. 11, 2005

(30) Foreign Application Priority Data

Sep. 11, 2002 (JP) .............................. 2002-264961
Sep. 2, 2003 (JP) .............................. 2003-310586

(51) Int. Cl.
*G09G 5/00* (2006.01)
(52) U.S. Cl. ................. 345/204; 348/222.1; 348/231.9
(58) Field of Classification Search ................ 345/204; 348/222.1, 231.9, 231.77
See application file for complete search history.

(56) References Cited

U.S. PATENT DOCUMENTS

| | | | |
|---|---|---|---|
| 7,068,310 B1 * | 6/2006 | Ikeyama | 348/239 |
| 7,081,918 B2 * | 7/2006 | Takemoto | 348/223.1 |
| 2007/0035654 A1 * | 2/2007 | Oochi | 348/362 |

FOREIGN PATENT DOCUMENTS

| | | |
|---|---|---|
| JP | A-9-224194 | 8/1997 |
| JP | A-2000-312311 | 11/2000 |

\* cited by examiner

*Primary Examiner*—Richard Hjerpe
*Assistant Examiner*—Leonid Shapiro
(74) *Attorney, Agent, or Firm*—Straub and Pokotylo; John C. Pokotylo

(57) ABSTRACT

An electronic camera apparatus comprises: an A/D unit 4 obtaining captured image data by A/D converting an image signal obtained by capturing an image; a preprocessing unit A 5a executing a preprocess for generating image data to be recorded from the captured image data; a preprocessing unit B 5b, which is allowed to execute a process in parallel with the preprocess executed by the preprocessing unit A 5a, executing a preprocess that includes a filter process and a pixel number conversion process in order to generate image data to be displayed, whose data amount is smaller than the image data to be recorded, from the captured image data; a buffer memory 9 temporarily storing both image data for which the preprocess is executed by the preprocessing unit A 5a, and image data for which the preprocess is executed by the preprocessing unit B 5b; and a processing unit 5c executing an image process for making recording and a display, which are related to the captured image data, based on the image data to be recorded and displayed, which are stored in the buffer memory 9.

16 Claims, 14 Drawing Sheets

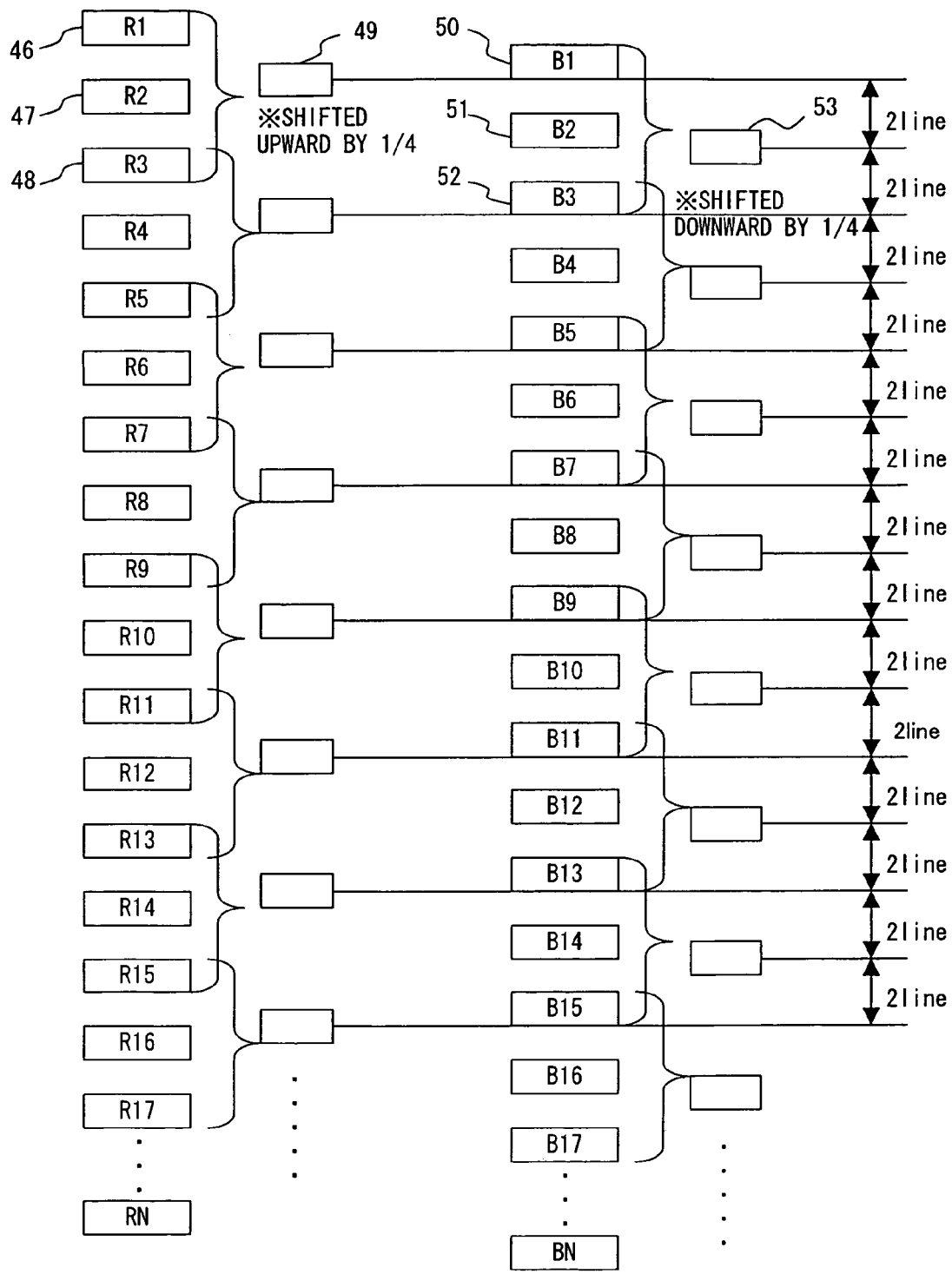
F I G. 4A

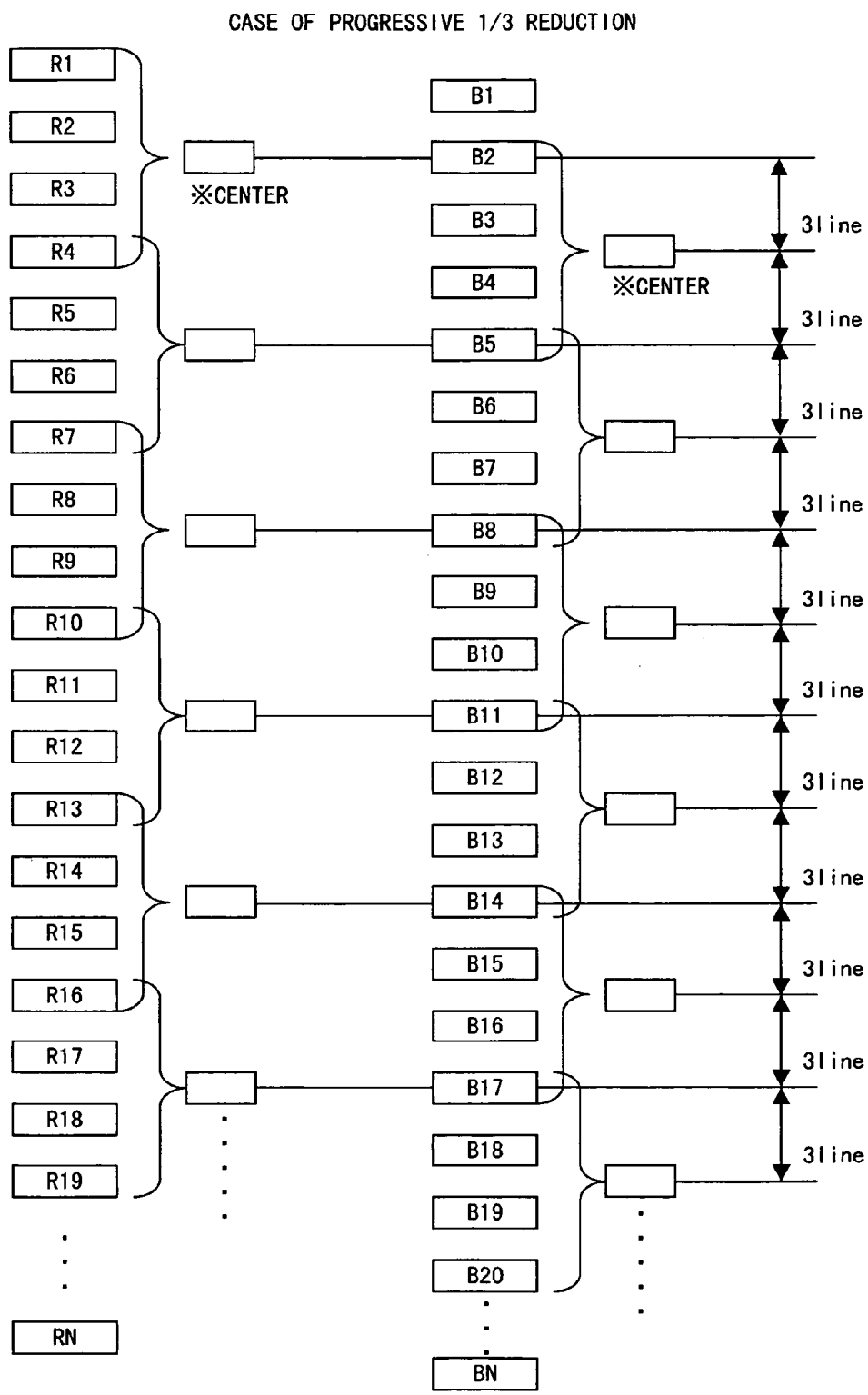
F I G. 4 B

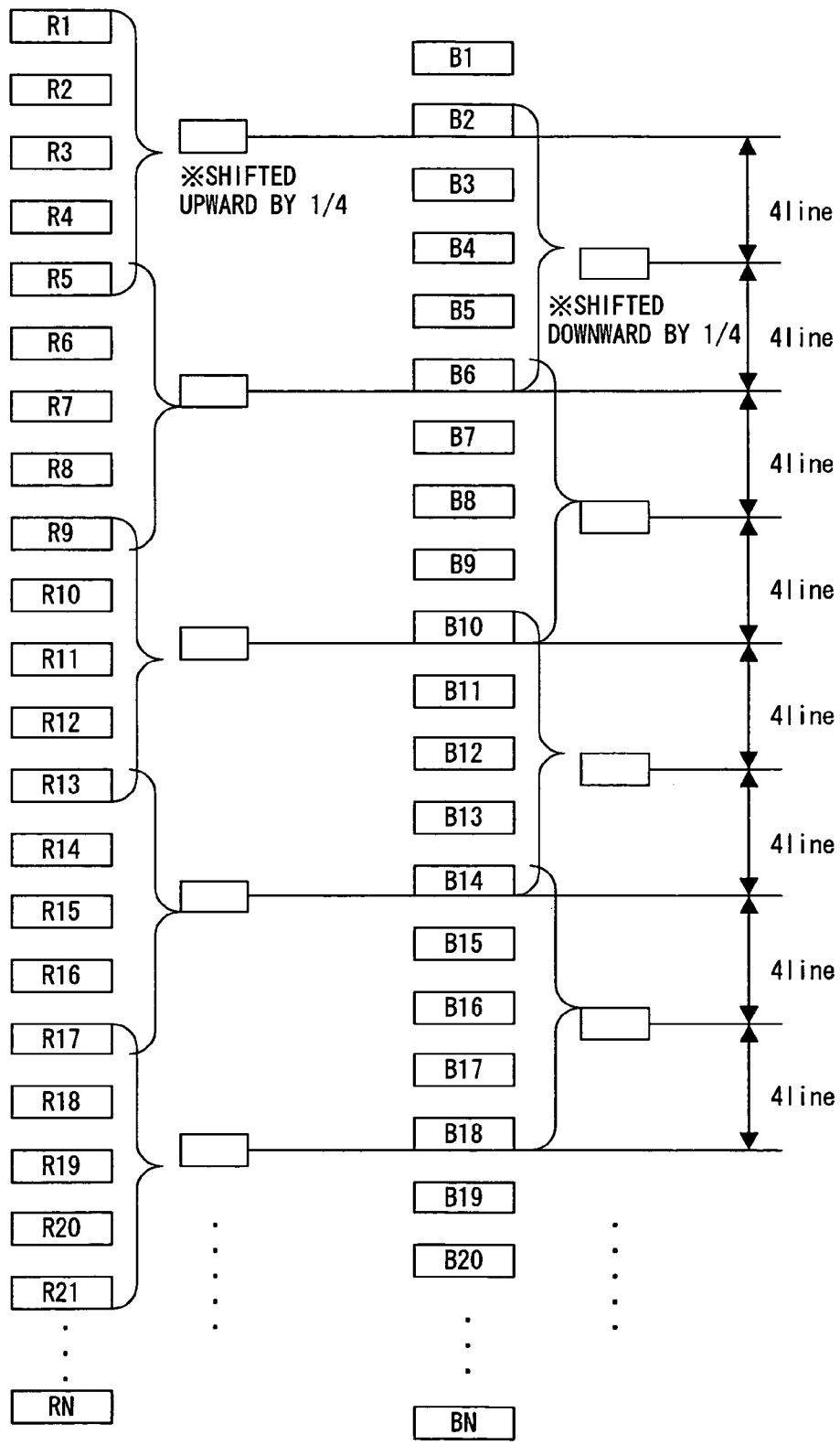
F I G. 5 A

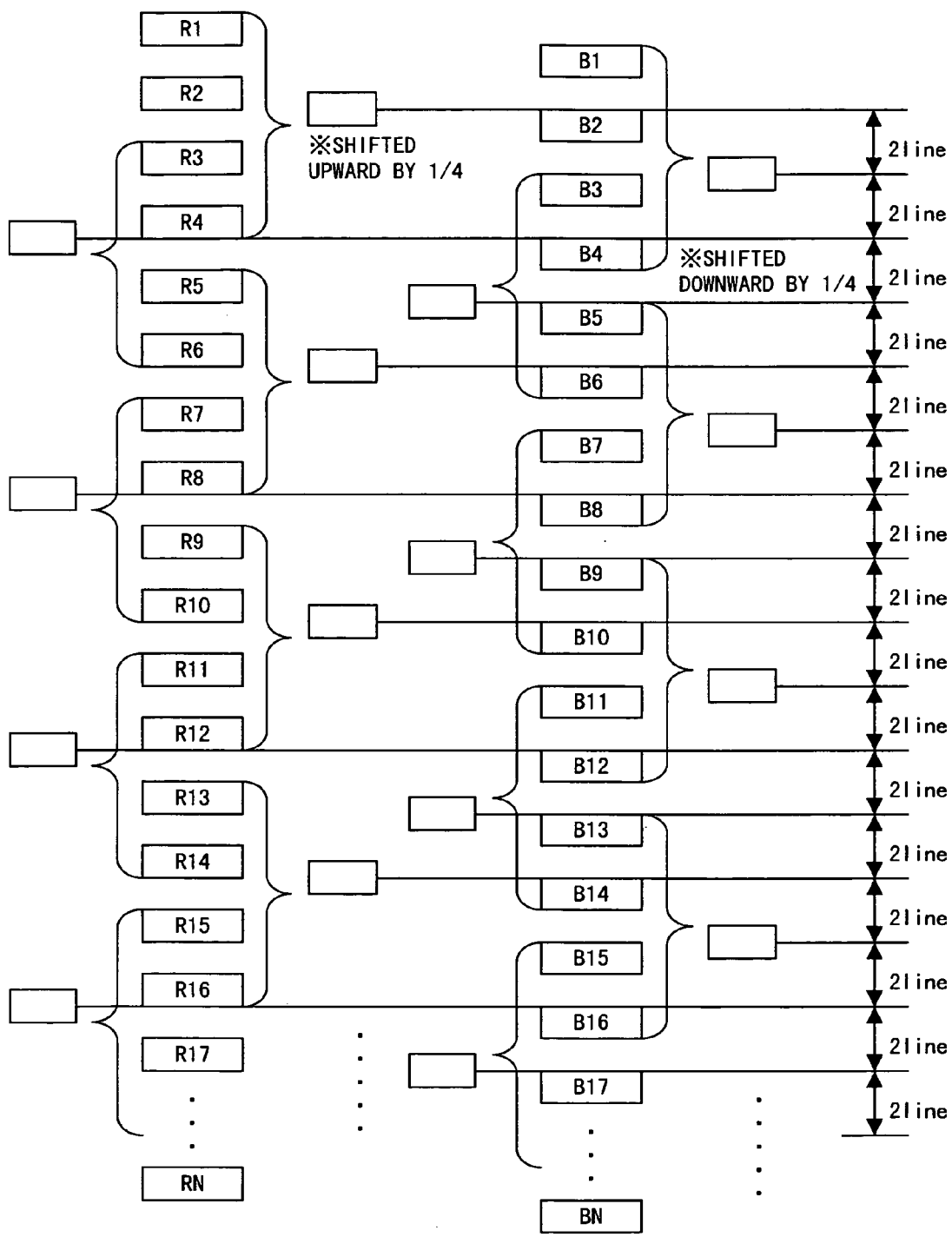
F I G. 7A

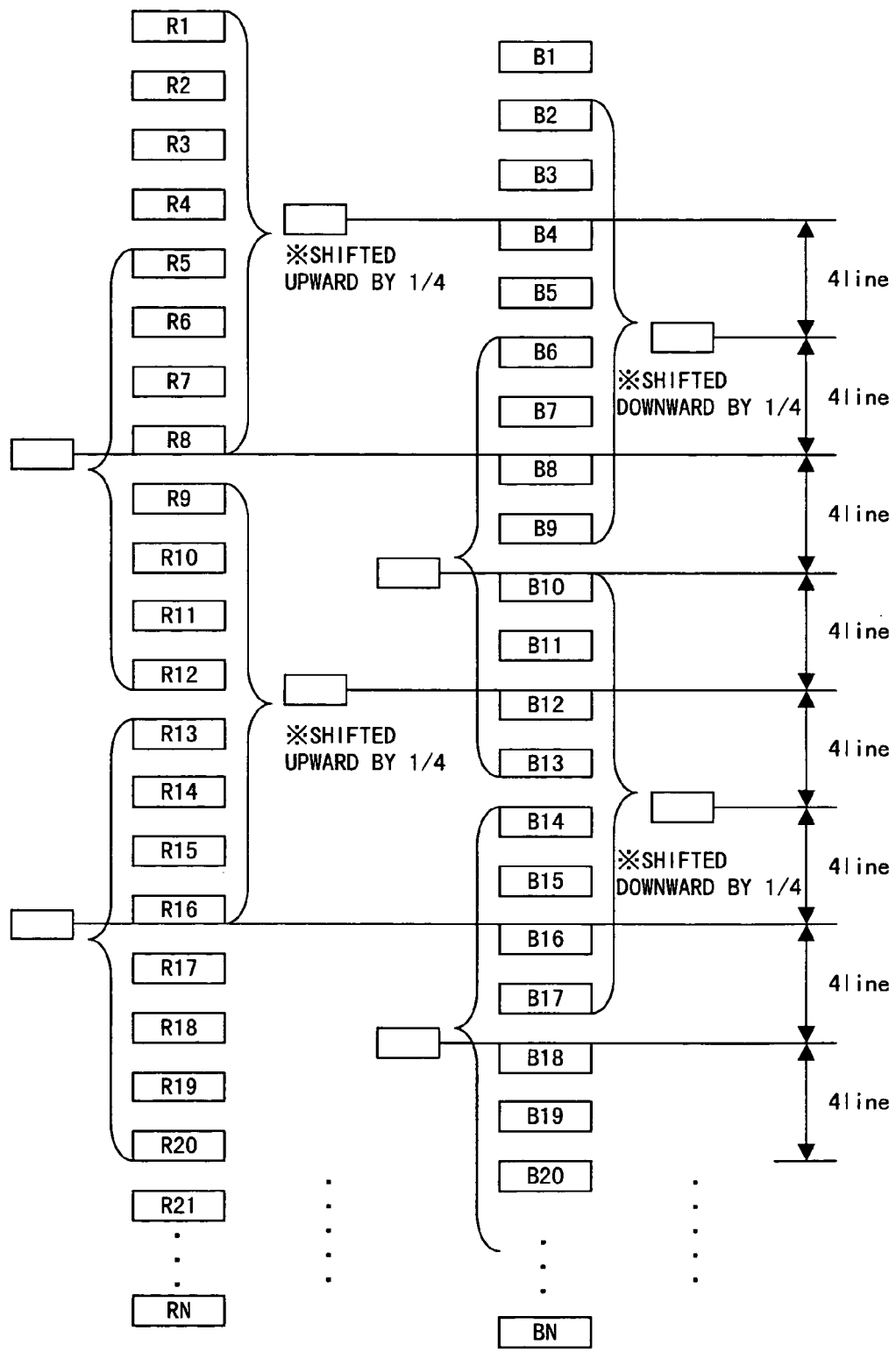
F I G. 8A

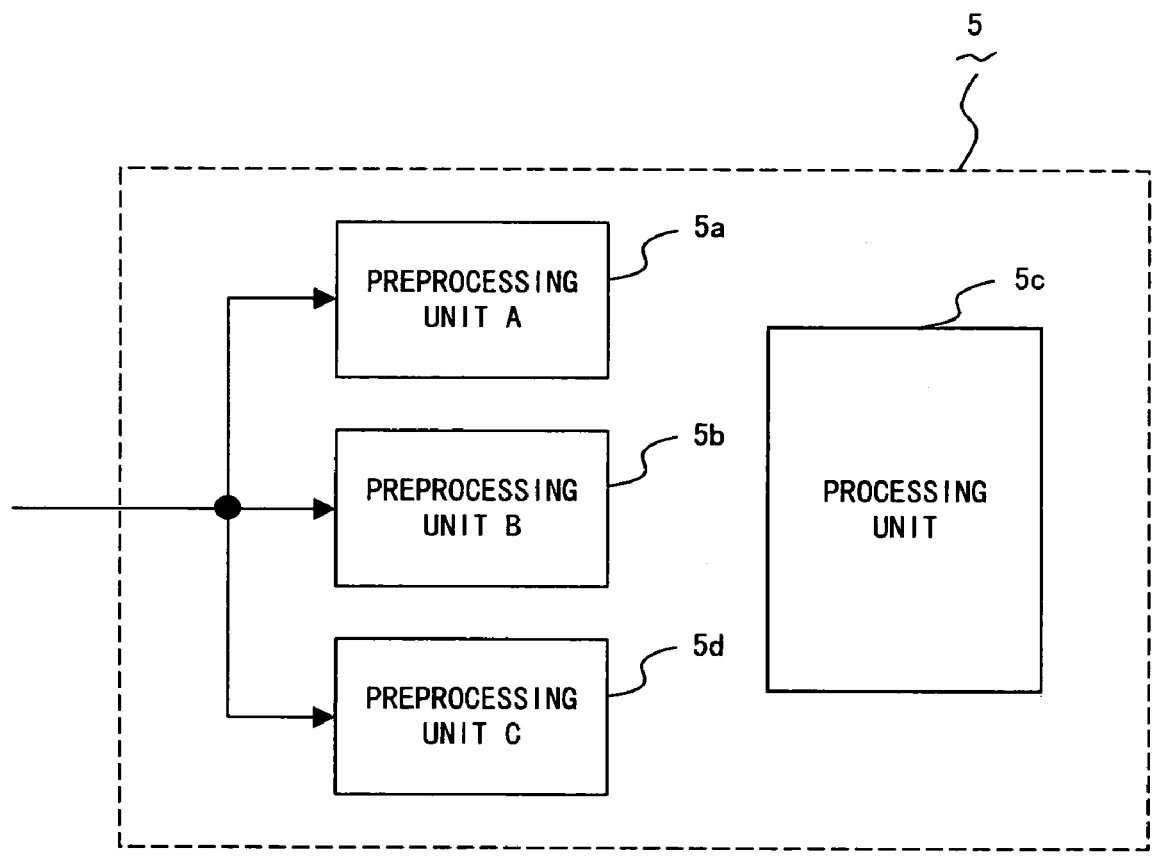
F I G. 9

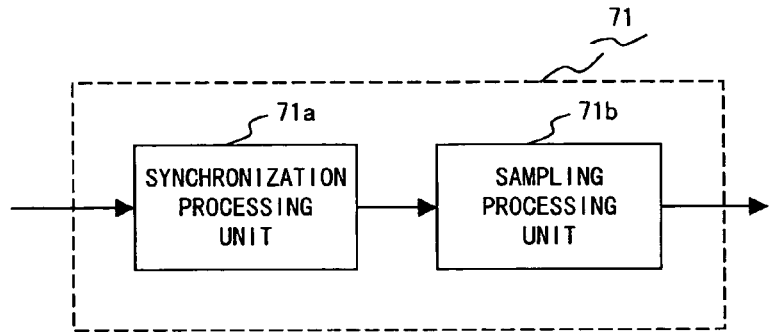
F I G. 1 0 A
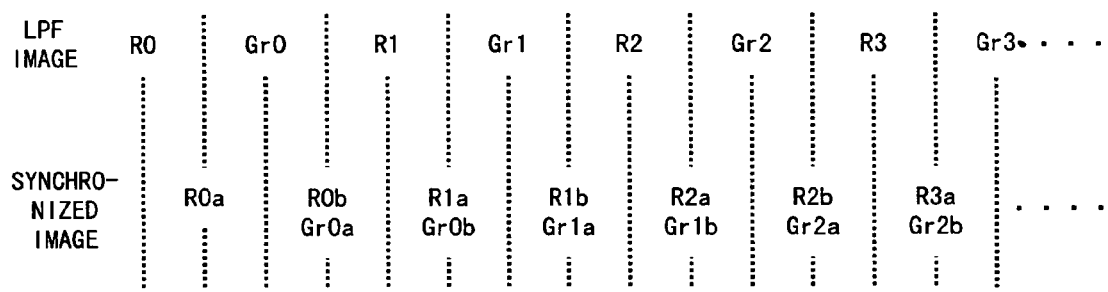
F I G. 1 0 B
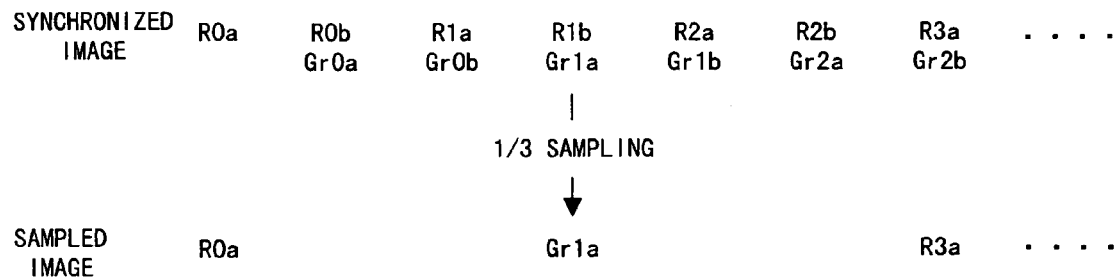
F I G. 1 0 C

ELECTRONIC CAMERA APPARATUS AND IMAGE PROCESSING METHOD THEREOF

CROSS REFERENCE TO RELATED APPLICATIONS

This application is based upon and claims the benefit of priority from the prior Japanese Patent Applications No. 2002-264961, filed Sep. 11, 2002; and No. 2003-310586, filed Sep. 2, 2003, the entire contents of which are incorporated herein by reference.

BACKGROUND OF THE INVENTION

1. Field of the Invention

The present invention relates to an electronic camera apparatus suitable for quickly verifying and displaying a shot image immediately after shooting, and to an image processing method thereof.

2. Description of the Related Art

Conventionally, there are electronic cameras having a function for enabling the verification and display of a shot image on a display unit such as an LCD (Liquid Crystal Display), etc. for a predetermined time period immediately after shooting so that the shot image can be verified immediately.

With a process related to this function, data which is captured from an image capturing element such as a CCD (Charge Coupled Devices), etc. and for which an image display process is not executed (hereinafter referred to as "RAW data") is temporarily stored in a buffer memory in normal cases.

Then, processes such as a process for generating and recording image data to be recorded from the temporarily stored RAW data, a process for generating and displaying image data to be verified and displayed, which is obtained by reducing, from the temporarily stored RAW data, the amount of image data to a display size (a size to be displayed on an LCD (Liquid Crystal Display), a size to be displayed on a video, etc.), and the like are executed. Additionally also a process for generating image data such as a thumbnail image, an index image, etc. is executed.

In the meantime, as one example of a technology for generating image data to be displayed on a monitor, and image data to be recorded, Japanese Patent Publication No. 09-224194 proposes a shooting apparatus that enables the generation of image data to be monitored in real time, and image data to be recorded.

This shooting apparatus makes an opto-electrically converting unit perform an operation for outputting image data of two systems, when a display is made on a monitor. Additionally, a process for making a shooting image processing unit perform an operation for generating image data to be monitored according to an image data input of two systems is executed. Furthermore, when a recording operation is performed, a process for making the opto-electrically converting unit perform an operation for outputting image data of one system, and for making the shooting image processing unit perform an operation for generating image data to be recorded according to an image data input of one system is executed.

Furthermore, as one example of a technology for implementing the speed-up of an image capturing process, Japanese Patent Publication No. 2000-312311 proposes a signal processing apparatus that controls a write of a digital video signal, which is obtained from a television camera, to a memory, partitions the signal into arbitrary areas in a two-dimensional space manner, and processes the video signal in the respectively partitioned areas in parallel.

SUMMARY OF THE INVENTION

An electronic camera apparatus according to one preferred embodiment of the present invention comprises: an A/D converting unit obtaining captured image data by A/D converting an image signal that is obtained by capturing an image; a first image data processing unit executing a preprocess for generating image data to be recorded from the captured image data; a second image data processing unit, which is allowed to execute a process in parallel with the preprocess executed by the first image data processing unit, executing a preprocess that includes a filter process and a pixel number conversion process in order to generate image data to be displayed, whose data amount is smaller than the image data to be recorded, from the captured image data; a storing unit temporarily storing both image data, which is obtained by the first image data processing unit and for which the preprocess for generating image data to be recorded is executed, and image data, which is obtained by the second image data processing unit and for which the preprocess for generating image data to be displayed is executed; and a third image data processing unit executing an image process for making recording and a display, which are related to the captured image data, based on the image data to be recorded and the image data to be displayed, which are stored in the storing unit.

BRIEF DESCRIPTIONS OF THE DRAWINGS

FIG. 1 exemplifies the configuration of an electronic camera, which is one example of an electronic camera apparatus according to one preferred embodiment of the present invention;

FIG. 2 shows an example of the configuration of a preprocessing unit executing a filter process, and a pixel number conversion process that includes an interpolation process considering a pixel position relationship after pixel number conversion;

FIG. 3A explains a process for the horizontal direction of captured image data;

FIG. 3B explains a process for the horizontal direction of captured image data;

FIG. 3C explains a process for the horizontal direction of captured image data;

FIG. 3D explains a process for the horizontal direction of captured image data;

FIG. 4A exemplifies a process for the vertical direction of captured image data in the case where a pixel number reduction ratio is 1/2;

FIG. 4B exemplifies a process for the vertical direction of captured image data in the case where a pixel number reduction ratio is 1/3;

FIG. 5A exemplifies a process for the vertical direction of captured image data in the case where a pixel number reduction ratio is 1/4;

FIG. 5B exemplifies a process for the vertical direction of captured image data in the case where a pixel number reduction ratio is 1/5;

FIG. 7A shows another example of a process for the vertical direction of captured image data in the case where a pixel number reduction ratio is 1/2;

FIG. 8A shows another example of a process for the vertical direction of captured image data in the case where a pixel number reduction ratio is 1/4;

FIG. 9 shows another example of the configuration of an image processing unit;

FIG. 10A explains a horizontal direction pixel number converting unit having a different configuration;

FIG. 10B explains a horizontal direction pixel number converting unit having the different configuration; and FIG. 10C explains a horizontal direction pixel number converting unit having the different configuration.

DESCRIPTION OF THE PREFERRED EMBODIMENT

Hereinafter, a preferred embodiment according to the present invention is explained with reference to the drawings.

Figure 1:
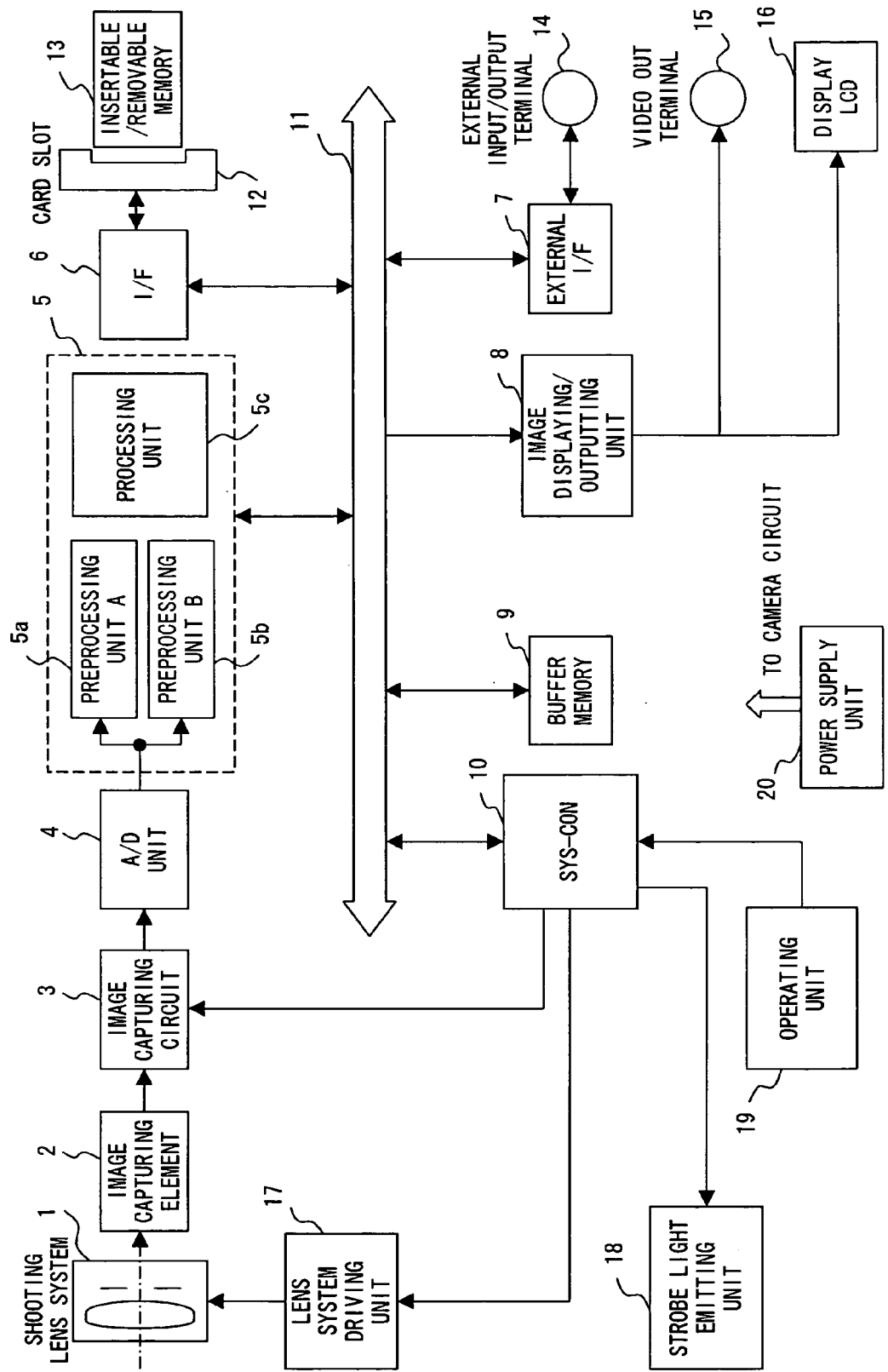

FIG. 1 exemplifies the configuration of an electronic camera, which is one example of an electronic camera apparatus according to one preferred embodiment of the present invention. The electronic camera apparatus is an apparatus having an electronic camera function. Examples of the electronic camera apparatus include an electronic camera naturally, and also include cellular phone, a portable information terminal, etc., which have an electronic camera function. In this preferred embodiment, the electronic camera shown in FIG. 1 is applied as one example of the electronic camera apparatus. However, the above described cellular phone, portable information terminal, etc., which have an electronic camera function, are also applicable.

In FIG. 1, this electronic camera has a function (hereinafter referred to as a rec view display function) for enabling an image, which is obtained by shooting, to be verified and displayed for a predetermined time period immediately after the shooting.

A shooting lens system 1 comprises a focus lens, an aperture, etc., and forms a subject image on an image capturing element 2.

The image capturing element 2 is, for example, a CCD (Charge Coupled Device), and opt-electrically converts the subject image formed on the image capturing element 2 by an action of the shooting lens system 1, and outputs an electric signal (image signal) that represents the image. A scanning method of the image capturing element 2 is, for example, a progressive scanning method, an interlaced scanning method, etc.

An image capturing circuit 3 is configured by comprising a CDS (Correlated Double Sampling) reducing a noise component, an AGC (Automatic Gain Control) stabilizing a signal level, etc. The image capturing circuit 3 reduces the noise component of an analog electric signal output from the image capturing element 2, stabilizes the level of the signal, and outputs the signal under the control of a system controller 10 (hereinafter abbreviated to sys-con 10).

An A/D unit 4 converts the analog electric signal output from the image capturing circuit 3 into a digital electric signal, and outputs the digital electric signal. In this specification, the digital electric signal output from the A/D unit 4 is referred to as captured image data.

An image processing unit 5 comprises a preprocessing unit A 5a, a preprocessing unit B 5b, a processing unit 5c, etc., and executes various types of image processes.

The preprocessing unit A 5a executes a preprocess for generating image data to be recorded from the captured image data output from the A/D unit 4. For example, as the preprocess, various types of image processes such as white balance correction, LPF color separation, color matrix correction, color γ correction, YC conversion, image enlargement/reduction (resize), etc. are executed. The image data to be recorded is recorded to a buffer memory 9 as main image data.

The preprocessing unit B 5b, which is allowed to execute a process in parallel with the preprocess executed by the preprocessing unit A 5a, executes a preprocess that includes a filter process, and a pixel number conversion process considering a pixel position relationship after pixel number conversion. With this preprocess, image data to be displayed, which is suitable for verifying and displaying an image, and whose data amount is smaller than image data to be recorded, is obtained. The image data to be displayed is used as sub-image data having the number of pixels, which is suitable for the resolution of a display device or the display LCD 16, namely, whose image data amount is smaller than main image data, which is image data having a large number of pixels.

The processing unit 5c executes an image process for making recording, which is related to the captured image data, based on the image data to be recorded, which is temporarily stored in the buffer memory 9, an image process for making a display, which is related to the captured image data based on the image data to be displayed, which is temporarily stored in the buffer memory 9, and other various types of image processes. For example, a process for compressing/decompressing image data with a JPEG (Joint Photographic Experts Group) method for recording/replaying image data, or the like. is executed. Additionally, also a process for generating index image data (including thumbnail image data), whose data amount is smaller than the above described image data to be displayed, and the like are executed.

Furthermore, all of the image processing unit 5, an I/F 6, an external I/F 7, an image displaying/outputting unit 8, the buffer memory 9, and the sys-con 10 are connected to a bus 11.

The I/F (interface) 6 is intended to provide an interface function for enabling data to be exchanged between the electronic camera and an insertable/removable memory 13 that is inserted into a card slot 12.

The insertable/removable memory 13 is a recording medium insertable/removable into/from the electronic camera, and is a recording medium for storage, on which image data representing an image shot with this electronic camera, etc. are recorded. For example, the insertable/removable memory 13 is a memory card such as smart media (trademark), compact flash (trademark), etc.

The external I/F 7 is intended to provide an interface function for enabling data to be exchanged between the electronic camera and an external device that is connected to an external input/output terminal 14.

The image displaying/outputting unit 8 executes processes such as a process for generating and outputting a video signal that a display device connected to a video out terminal 15 or the LCD 16 can display based on the image data to be displayed, for which the image process is executed by the processing unit 5c. As a result, an image, etc. based on the video signal is displayed, for example, on the display device connected to the video out terminal 15, or the display LCD 16.

The buffer memory 9 is, for example, a DRAM (Dynamic Random Access Memory), and is a memory used for temporarily storing image data, etc., which is being processed in the various types of image processes executed by the image processing unit 5, or used as a working area for executing a control process by the sys-con 10. For example, image data to be recorded, which is obtained by the preprocessing unit A 5a, image data to be displayed, which is obtained by the preprocessing unit B 5b, and the like are temporarily stored.

The sys-con 10 is configured by comprising a CPU (Central Processing Unit), and controls the operations of the entire electronic camera by executing a camera program stored in an internal memory not shown.

A lens system driving unit 17 controls the shooting lens system 1 (focus lens position, aperture, etc.) under the control of the sys-con 10.

A strobe light emitting unit 18 emits strobe light under the control of the sys-con 10.

An operating unit 19 is various types of buttons, switches, etc. for accepting various types of instructions from a shooter, and for notifying the sys-con 10 that an instruction is accepted. The operating unit 19 is, for example, a release button enabling a shooting instruction, a rec view button enabling an instruction to use the above described rec view display function, and the like.

A power supply unit 20 supplies power to the respective units of the electronic camera.

Described up to this point is the configuration of the electronic camera.

Operations of this electronic camera are explained next.

Here, as one example of the operations, an operation of the electronic camera, which is performed when the instruction to use the rec view display function, and the shooting instruction are issued. The sys-con 10 reads and executes the camera program stored in the internal memory, so that this operation is implemented.

In this operation, the rec view button is pressed by a shooter to issue the instruction to use the rec view display function. Thereafter, when the release button is pressed to issue the shooting instruction, a subject image formed by the action of the shooting lens system 1 is opto-electrically converted by the image capturing element 2, and an analog electric signal is output.

The noise component of this analog electric signal is reduced by the image capturing circuit 3, and its signal level is stabilized. Then, the analog electric signal is converted into captured image data, which is a digital electric signal, by the A/D unit 4.

The captured image data is input to the preprocessing units A 5a and B 5b respectively. Then, a process for obtaining image data to be recorded, and a process for obtaining image data to be displayed are executed respectively by the preprocessing units A 5a and B 5B in parallel.

Namely, the preprocessing unit A 5a executes various types of image processes such as white balance correction, LPF color separation, color matrix correction, color γ correction, YC conversion, image enlargement/reduction (resize), etc. for the input captured image data, so that the image data to be recorded is obtained. The obtained image data to be recorded is temporarily stored in the buffer memory 9.

In parallel with the above described process executed by the preprocessing unit A 5a, the preprocessing unit B 5b executes a preprocess that includes a filter process, and a pixel number conversion process considering a pixel position relationship after pixel number conversion for the input captured image data, so that the image data to be displayed, which is suitable for a preview display of the image on the display LCD (or the display device connected to the video out terminal 15), and whose data amount is smaller than the above described image data to be recorded, is obtained. The obtained image data to be displayed is temporarily stored in the buffer memory 9.

The image data to be displayed, which is temporarily stored in the buffer memory 9, is read by the processing unit 5c. The processing unit 5c then executes processes such as an image process for making a display, which is related to the captured image data, a process for generating index image data, whose data amount is smaller than the image data to be displayed, from the image data to be displayed, and the like. With the image process for making a display, which is related to the captured image data, for example, image processes such as white balance correction, LPF color separation, color matrix correction, color γ correction, YC conversion, image reduction, etc. are executed. Additionally, for the generated index image data, an image data compression process, etc. are executed.

Then, the image displaying/outputting unit 8 generates a video signal that the display LCD 16 (or the display device connected to the video out terminal 15) can display based on the image data for which the image process for making a display, which is related to the captured image data, is executed, and outputs the generated video signal to the display LCD 16 (or the display device connected to the video out terminal 15). Then, the image based on the video signal is displayed on the display LCD 16 (or the display device connected to the video out terminal 15). The image displayed at this time continues to be displayed for a preset time period, which is related to the rec view display function.

In the meantime, the image data to be recorded, which is temporarily stored in the buffer memory 9, is read by the processing unit 5c. Then, the image data compression process, etc. are executed as the image process for making recording, which is related to the captured image data, by the processing unit 5c, and the image data to be recorded is recorded to the insertable/removable memory 13 via the I/F 6 and the card slot 12. At this time, also the above described index image data for which the image data compression process, etc. are executed is recorded together.

With the above described operation, the preprocess for generating image data to be recorded from captured image data before being recorded to the buffer memory 9 is executed by the preprocessing unit A 5a when the instruction to use the rec view display function, and the shooting instruction are issued. In parallel with this preprocess, the preprocess for generating image data to be displayed from the captured image data before being stored in the buffer memory 9 is executed by the preprocessing unit B 5b. As a result, image data to be verified and displayed (image data for the rec view display) can be obtained without executing a process for reading captured image data from the buffer memory 9. Accordingly, processing time required until image data to be verified and displayed is obtained can be significantly reduced. Additionally, a shot image can be quickly verified and displayed immediately after shooting.

Configuration of the above described preprocessing unit B 5b, and contents of the processes executed by the preprocessing unit B 5b are further explained in detail.

This explanation is provided separately for the case where the scanning method of the image capturing element 2 is a progressive scanning method, and for the case where the scanning method is an interlaced scanning method. Both of the cases assume that the image capturing element 2 is configured by a single color CCD using a primary color filter, which is implemented by a Bayer method that respectively assigns 2 pixels of G (green), 1 pixel of R (red), and 1 pixel of B (blue) to 4 pixels of 2×2.

Firstly, configuration of the preprocessing unit B 5b, and the contents of the process executed by the preprocessing unit B 5b in the case where the scanning method of the image capturing element 2 is a progressive scanning method are explained.

Figure 2:
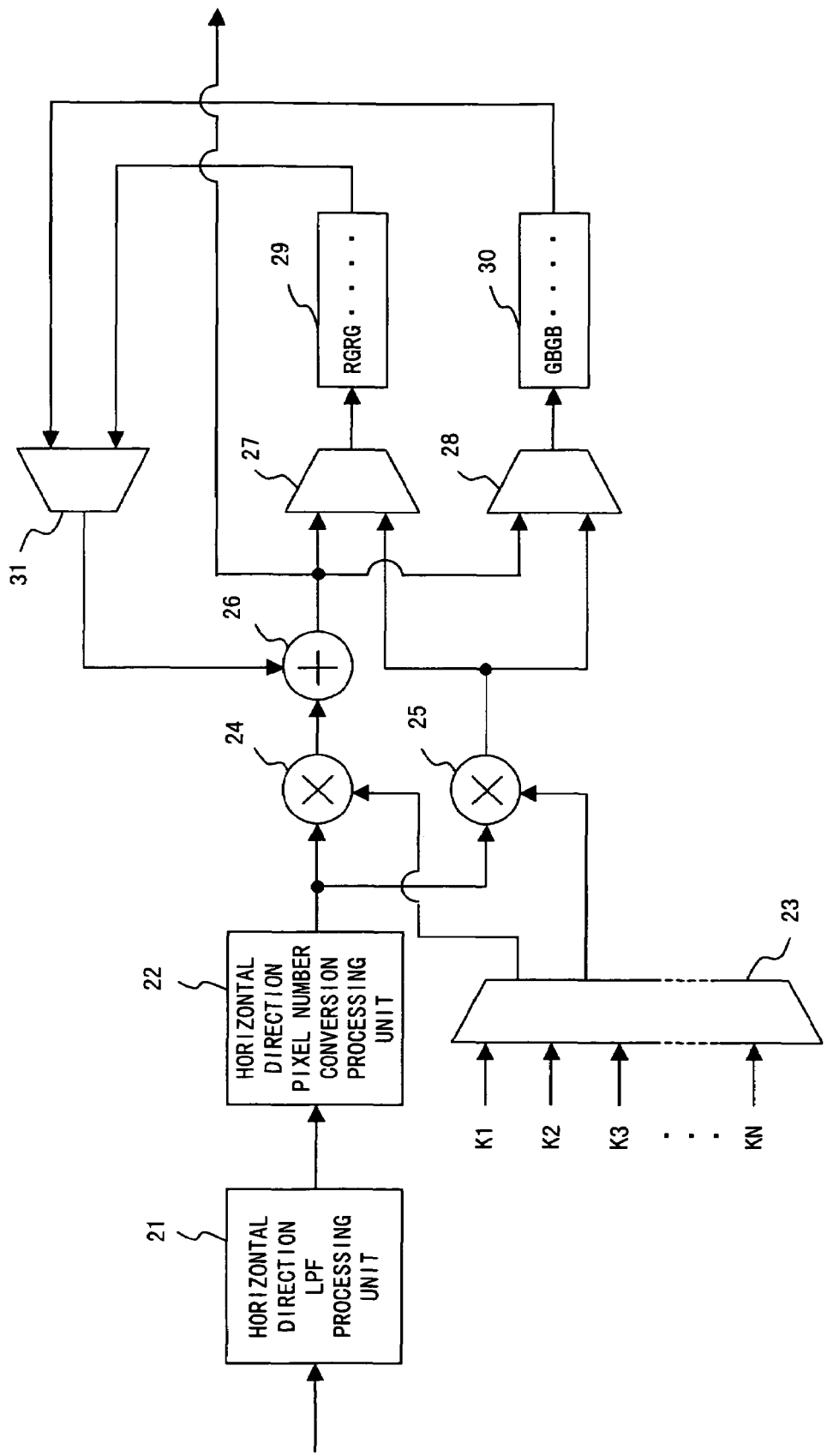

FIG. 2 exemplifies the configuration of the preprocessing unit B 5b.

In this figure, a horizontal direction LPF processing unit 21 and a horizontal direction pixel number conversion processing unit 22 are configured to execute an LPF process, and a pixel number conversion process that includes an interpolation process considering a pixel position relationship after pixel number conversion for the horizontal direction of captured image data. Here, the horizontal direction of captured image data means a direction that is an input order of captured image data input to the horizontal LPF processing unit 21, namely, line direction.

The LPF process, and the pixel number conversion process that includes the interpolation process considering a pixel position relationship after pixel number conversion for the horizontal direction of captured image data are referred to simply as a process for the horizontal direction of captured image data hereinafter.

The horizontal direction LPF processing unit 21 executes the LPF process for line data (captured image data) sequentially input from the A/D unit 4. Since the scanning method of the image capturing element 2 is a progressive scanning method, line data composed of R and G (referred to simply as R line data hereinafter), and line data composed of G and B (referred to simply as G line data hereinafter) are input alternately.

The horizontal direction pixel number conversion processing unit 22 executes a pixel number conversion process that includes an interpolation process considering a pixel position relationship after pixel number conversion for the output line data of the horizontal direction LPF processing unit 21. Note that the horizontal direction pixel number conversion processing unit 22 executes the process by setting a pixel number reduction ratio to 1/integer in the pixel number conversion process. In this way, the number of pixels can be freely converted into line data according to the memory capacities of line buffers 29 and 30 at a later stage, and the line data can be output. Additionally, with the interpolation process, interpolation is performed by selecting a combination of pixels, etc. so that the influence of pixel positions to be interpolated becomes suitable, according to a pixel number reduction ratio.

Furthermore, four selectors 23, 27, 28, and 31, two multipliers 24 and 25, an adder 26, and two line buffers 29 and 30 are configured to execute an LPF process, and a pixel number conversion process that includes an interpolation process considering a pixel position relationship after pixel number conversion for the vertical direction of captured image data. Here, the vertical direction of captured image data means the vertical direction relative to the above described horizontal direction.

The LPF process, and the pixel number conversion process that includes the interpolation process considering a pixel position relationship after pixel number conversion for the vertical direction of captured image data are referred to simply as a process for the vertical direction of captured image data hereinafter.

In the pixel number conversion process using the configuration to execute the process for the vertical direction of captured image data, its pixel number reduction ratio is set to 1/integer so that the number of line buffers used can be suppressed to 2, and the number of components and components cost can be reduced.

The selectors 23, 27, 28, and 31 select one piece of input data from among a plurality of pieces of input data, and outputs the selected input data. K1, K2, K3, ..., KN, which are input to the selector 23, are factors including a filter factor and an interpolation factor, which are related to the process for the vertical direction of captured image data, and multiplied with the output line data of the horizontal direction pixel number conversion processing unit 22. In this way, the total number of factors used is reduced. Additionally, the value of each factor, and the total number N of factors vary depending on a pixel number reduction ratio in the vertical direction, or the like. These factors may be recorded to the internal memory of the sys-con 10, or may be obtained with a calculation made by the sys-con 10 according to the above described pixel number reduction ratio.

The multipliers 24 and 25 multiply two pieces of input data, and output the multiplied data.

The adder 26 adds two pieces of input data, and outputs the added data.

The line buffers 29 and 30 temporarily store line data, which is being processed in the process for the vertical direction of captured image data. In this example, R line data is stored in the line buffer 29, whereas B line data is stored in the line buffer 30.

Contents of the process executed by the preprocessing unit B 5b having the above described configuration are explained next.

Firstly, the process for the horizontal direction of captured image data is explained with reference to FIGS. 3A, 3B, 3C, and 3D.

As described above, R line data and B line data, which are captured image data, are alternately input to the horizontal direction LPF processing unit 21. For the input line data, an LPF process is executed by the horizontal direction LPF processing unit 21, for example, with filter factors of a 3-tap filter size shown in FIG. 3A, and the processed line data is output to the horizontal direction pixel number conversion processing unit 22.

One example of the LPF process executed at this time is explained with reference to FIG. 3B.

Figure 3A:
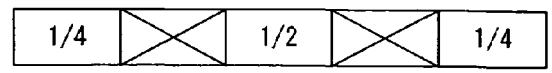
Figure 3B:
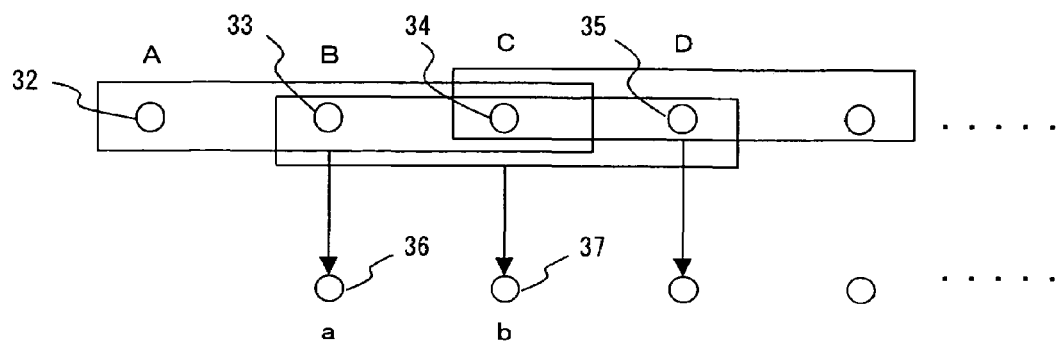

An upper stage of FIG. 3B indicates line data input to the horizontal direction LPF processing unit 21, whereas a lower stage of FIG. 3B indicates line data output from the horizontal direction LPF processing unit 21. The input line data and the output line data, which are shown in FIG. 3B, indicate only pixels in the same color (such as R) for convenience of explanation. However, the LPF process is similarly executed for pixels in other colors (such as B or G) (the same is applied to FIGS. 3C and 3D).

As shown in FIG. 3B, a value a of a pixel 36 of the output line data is obtained with "A×1/4+B×1/2+C×1/4" by using values A, B, and C of pixels 32, 33, and 34 of the input line data, and the above described filter factors. Additionally, a value b of a pixel 37 of the output line data is obtained with "B×1/4+C×1/2+D×1/4" by using values B, C, and D of the pixels 33, 34, and 35 of the input line data, and the above described filter factors. Subsequently, the value of each pixel is obtained in a similar manner, so that the output line data is obtained. Note that the number of stages of the above described filters is not limited to this implementation, and may be configured as a larger number as a matter of course.

The output line data thus obtained is input to the horizontal direction pixel number conversion processing unit 22. Then, the pixel number conversion process that includes an interpolation process considering a pixel position relationship after pixel number conversion is executed, and the processed line data is output to a later stage.

One example of the process executed by the horizontal direction pixel number conversion processing unit 22 at this time is explained with reference to FIGS. 3C and 3D. Here, the case where a pixel number reduction ratio is set to 2/3, and the case where the pixel number reduction ratio is set to 1/2 are explained respectively as an example where the process is executed with an arbitrary pixel number reduction ratio, and as an example where the pixel number reduction ratio is 1/integer as described above, with reference to FIGS. 3C and 3D respectively.

Figure 3C:
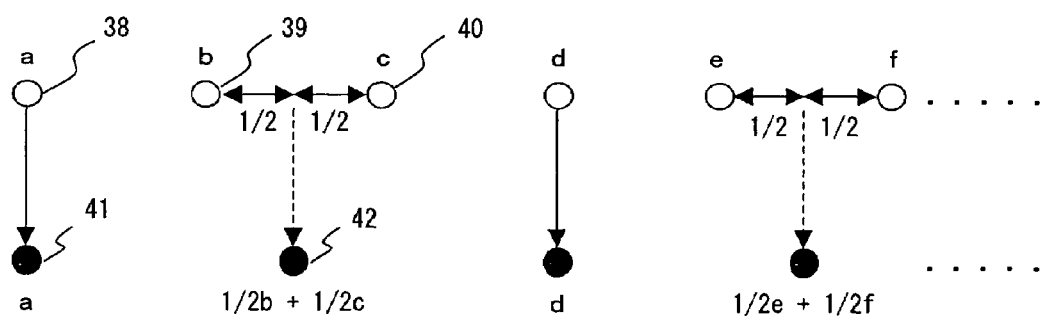

An upper stage of FIG. 3C indicates line data input to the horizontal direction pixel number conversion processing unit 22 (output line data of the horizontal direction LPF processing unit 21), whereas a lower stage of FIG. 3C indicates line data output from the horizontal direction pixel number conversion processing unit 22.

As shown in FIG. 3C, in the process executed by the horizontal direction pixel number conversion processing unit 22, a pixel number conversion process using a pixel number reduction ratio, which is 2/3 (1/1.5), is executed with 2-point interpolation in consideration of a pixel position relationship after pixel number conversion. This 2-point interpolation is performed by selecting a combination of pixels, etc. so that the influence of pixel positions to be interpolated becomes suitable according to the pixel number reduction ratio (reduced image size) in the horizontal direction. Namely, the value of a pixel 41 of the output line data is obtained with "a×1+b×0" by using values a and b of pixels 38 and 39 of the input line data. Additionally, the value of a pixel 42 of the output line data is obtained with "b×1/2+c×1/2" by using values b and c of the pixels 39 and 40 of the input line data. Subsequently, the value of each pixel is obtained in a similar manner, so that the output line data is obtained.

Figure 3D:
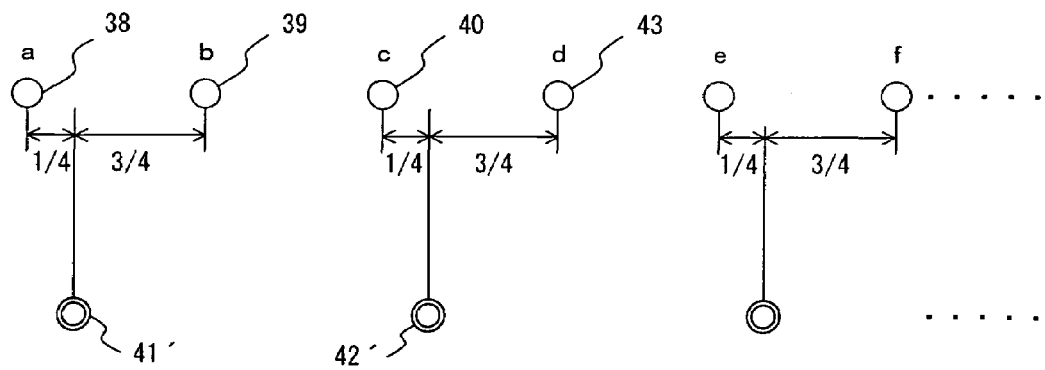

Similarly, as shown in FIG. 3D, in the process executed by the horizontal direction pixel number conversion processing unit 22, a pixel number conversion process using a pixel number reduction ratio, which is 1/2, is executed with 2-point interpolation in consideration of a pixel position relationship after pixel number conversion. Namely, the value of a pixel 41' of the output line data is obtained with "a×3/4+b×1/4" by using values a and b of pixels 38 and 39 of the input line data, whereas the value of a pixel 42' of the output line data is obtained with "c×3/4+d×1/4" by using values c and d of pixels 40 and 43 of the input line data. Subsequently, the value of each pixel is obtained in a similar manner, so that the output line data is obtained.

With the above described process for the horizontal direction of captured image data, R line data and B line data, for which the process of the horizontal direction pixel number conversion processing unit 22 is executed, are alternately output from the horizontal direction pixel number conversion processing unit 22.

The process for the vertical direction of captured image data is explained next with reference to FIGS. 4A, 4B, 5A, and 5B.

FIGS. 4A, 4B, 5A, and 5B show examples of a process for the vertical direction of captured image data in the case where a pixel number reduction ratio is 1/2, 1/3, 1/4, and 1/5.

In FIGS. 4A, 4B, 5A, and 5B, R1, R2, ..., RN indicate R line data in an Nth line within R line data output from the horizontal direction pixel number conversion processing unit 22, whereas B1, B2, ..., BN indicate B line data in an Nth line within B line data output from the horizontal direction pixel number conversion processing unit 22 (the same is applied to FIGS. 7A, 7B, 8A, and 8B).

Firstly, a process for the vertical direction of captured image data in the case where a pixel number reduction ratio is 1/2 is explained with reference to FIG. 4A.

The example shown in FIG. 4A is an example where a filter size for the LPF process is set to 3 taps, and a pixel number conversion process including a 2-point interpolation process is executed by selecting a combination of pixels, etc. so that the influence of pixel positions to be interpolated becomes suitable, according to the pixel number conversion ratio (reduced image size), which is 1/2, in the vertical direction.

Namely, as shown in FIG. 4A, the process is executed to obtain one piece of R line data, which becomes output line data, from 3 pieces of R line data, which become input line data, in a way such that one piece of R line data is obtained from R line data of R1, R2, and R3, and one piece of R line data is obtained from R line data of R3, R4, and R5. Additionally, the process is executed to obtain one piece of B line data, which becomes output line data, from 3 pieces of B line data, which become input line data, in a way such that one piece of B line data is obtained from B line data of B1, B2, and B3, and one piece of B line data is obtained from B line data of B3, B4, and B5.

When the pixel number reduction ratio is 1/even number, such as 1/2, 1/4, etc., the process for obtaining R line data, which is output line data, is executed by obtaining a factor Kr (Kr1, Kr2, ...) that shifts the R line data upward from the center of taps by 1/4, and by using the factor Kr, in consideration of a pixel position relationship after pixel number conversion. Additionally, the process for obtaining B line data, which is output line data, is executed by obtaining a factor Kb (Kb1, Kb2, ...) that shifts the B line data downward from the center of taps by 1/4, and by using the factor Kr (the same is applied also to the case where the image capturing element 2 uses an interlaced scanning method). These factors Kr and Kb are obtained, for example, by the sys-con 10 as described above. Or, these factors Kr and Kb may be stored in the internal memory of the sys-con 10, and read and used on demand.

If the pixel number reduction ratio is 1/2 as in this example, the process is executed by obtaining Kr1, Kr2, and Kr3 as the factor Kr, and by obtaining Kb1, Kb2, and Kb3 as the factor Kb.

Actually, in the process for obtaining R line data, which becomes output line data, respective 3 pieces of R line data, which become input line data, are multiplied respectively by the corresponding factors Kr1, Kr2, and Kr3, and their sum is obtained, so that the R line data can be shifted upward from the center of taps by 1/4. Namely, this can be implemented with "R line data in the first line×Kr1+R line data in the second line×Kr2+R line data in the third line×Kr3" in the 3 pieces of R line data, which become input line data.

In a similar manner, in the process for obtaining B line data, which becomes output line data, respective 3 pieces of B line data, which become input line data, are multiplied respectively by the corresponding factors Kb1, Kb2, and Kb3, and their sum is obtained, so that the B line data can be shifted downward from the center of taps by 1/4. Namely, this can be implemented with "B line data in the first line×Kb1+B line data in the second line×Kb2+B line data in the third line×Kb3" in the 3 pieces of B line data, which become input line data.

For example, if the value of a R pixel 49 of the R line data, which is output line data, is obtained from the values of R pixels 46, 47, and 48 in the same row of the R line data of R1, R2, and R3, which are input line data, 2-point interpolation is performed by respectively setting the weight of the values of the pixels 46 and 47, and the weight of the values of the pixels 47 and 48 to 1/2, 2 values are respectively obtained with the 2-point interpolation, and 2-point interpolation is performed for the obtained 2 values by respectively setting the side of R1 and R2 and the side of R2 and R3 to 3/4 and 1/4, so that the R line data can be shifted upward from the center of taps by 1/4.

That is, the R line data of R1, R2, and R3 are respectively multiplied by the weights of 1/2×3/4=3/8, 1/2×3/4+1/2×1/4=1/2, and 1/2×1/4=1/8, and their sum is obtained, so that the R line data can be shifted upward from the center of taps.

Additionally, if the value of a B pixel 53 of the B line data, which is output line data, is obtained from the values of B pixels 50, 51, and 52 in the same row of the B line data of B1, B2, and B3, which are input line data, 2-point interpolation is performed by respectively setting the weight of the values of the pixels 50 and 51, and the weight of the values of the pixels 51 and 52 to 1/2, 2 values are respectively obtained with the 2-point interpolation, and 2-point interpolation is performed for the obtained 2 values by respectively setting the side of B1 and B2 and the side of B2 and B3 to 1/4 and 3/4, so that the line data can be shifted downward from the center of taps by 1/4.

That is, the B line data of B1, B2, and B3 are respectively multiplied by the weights of 1/2×1/4=1/8, 1/2×1/4+1/2×3/4=1/2, and 1/2×3/4=3/8, and their sum is obtained, so that the B line data can be shifted downward from the center of taps by 1/4.

Accordingly, Kr1=3/8, Kr2=4/8, and Kr3=1/8 are obtained, and besides, Kb1=1/8, Kb2=4/8, and Kb3=3/8 are obtained.

Next, the flow of such a process is explained by using the configuration shown in FIG. 2. In this example, it is assumed that factors K1 to K3 are the above described factors Kr1 to Kr3 and factors K4 to K6 are the above described factors Kb1 to Kb4 as a factor K input to the selector 23.

As stated earlier, R line data and B line data, for which the process for the horizontal direction of captured image data is executed, are alternately output from the horizontal direction pixel number conversion processing unit 22.

Firstly, the line data of R1 is multiplied by K1, which is output from the selector 23, by the multiplier 25, and the multiplied data is stored in the line buffer 29 via the selector 27.

The line data of succeeding B1 is multiplied by K4, which is output from the selector 23, by the multiplier 25, and the multiplied data is stored in the line buffer 30 via the selector 28.

The line data of succeeding R2 is multiplied by K2, which is output from the selector 23, by the multiplier 24, the line data stored in the line buffer 29 is added by the adder 26 via the selector 31, and the resultant data is stored in the line buffer 29 via the selector 27.

The line data of succeeding B2 is multiplied by K5, which is output from the selector 23, by the multiplier 24, the line data stored in the line buffer 30 is added by the adder 26 via the selector 31, and the resultant data is stored in the line buffer 30 via the selector 28.

The line data of succeeding R3 is multiplied by K3, which is output from the selector 23, by the multiplier 24, the line data stored in the line buffer 29 is added by the adder 26 via the selector 31, and the resultant data is stored in the buffer memory 9. In this way, one piece of R line data, which is obtained from the R line data of R1, R2, and R3, is stored in the buffer memory 9. In the meantime, the line data of R3 is multiplied by K1, which is output from the selector 25, by the multiplier 25, and the multiplied data is stored in the line buffer 29 via the selector 27. Thereafter, the process for the R line data is executed in a similar manner.

The line data of succeeding B3 is multiplied by K6, which is output from the selector 23, by the multiplier 24, the line data stored in the line buffer 30 is added by the adder 26 via the selector 31, and the resultant data is stored in the buffer memory 9. In this way, one piece of B line data, which is obtained from the B line data of B1, B2, and B3, is stored in the buffer memory 9. In the meantime, the line data of B3 is multiplied by K4, which is output from the selector 23, by the multiplier 25, and the multiplied data is stored in the line buffer 30 via the selector 28. Thereafter, the process for the B line data is executed in a similar manner.

Explained up to this point is the process for the vertical direction of captured image data in the case where the pixel number reduction ratio is 1/2.

Next, a process for the vertical direction of captured image data in the case where the pixel number reduction ratio is 1/3 is explained with reference to FIG. 4B.

The example shown in FIG. 4B is an example where a filter size for the LPF process is set to 4 taps, and a pixel number conversion process including a 2-point interpolation process is executed by selecting a combination of pixels, etc. so that the influence of pixel positions to be interpolated becomes suitable, according to the pixel number reduction ratio (reduced image size), which is 1/3, in the vertical direction.

Namely, as shown in FIG. 4B, the process is executed to obtain one piece of R line data, which becomes output line data, from 4 pieces of R line data, which become input line data, in a way such that one piece of R line data is obtained from R line data of R1 to R4, and one piece of R line data is obtained from R line data of R4 to R7. Additionally, the process is executed to obtain one piece of B line data, which becomes output line data, from 4 pieces of B line data, which become input line data, in a way such that one piece of B line data is obtained from B line data of B2 to B5, and one piece of B line data is obtained from B line data of B5 to B8.

When the pixel number reduction ratio is 1/odd number, such as 1/3, 1/5, etc., the process for obtaining R line data, which becomes output line data, is executed by obtaining a factor Kr (Kr1, Kr2, . . . ) that makes the R line data become the center of taps, and by using the factor Kr, in consideration of a pixel position relationship after pixel number conversion. Additionally, the process for obtaining B line data, which becomes output line data, is executed by obtaining a factor Kb (Kb1, Kb2, . . . ) that makes the B line data become the center of taps, and by using the factor Kb (the same is applied also to the case where the image capturing element 2 uses an interlaced scanning method).

If the pixel number reduction ratio is 1/3 as in this example, the process is executed by obtaining Kr1, Kr2, Kr3, and Kr4 as a factor Kr, and by obtaining Kb1, Kb2, Kb3, and Kb4 as a factor Kb.

Actually, in the process for obtaining R line data, which becomes output line data, respective 4 pieces of R line data, which become input line data, are multiplied respectively by the corresponding factors Kr1, Kr2, Kr3, and Kr4, and their sum is obtained, so that the R line data can be made to become the center of taps. Namely, this can be implemented with "R line data in the first line×Kr1+R line data in the second line×Kr2+R line data in the third line×Kr3+R line data in the fourth line×Kr4" in the 4 pieces of R line data, which become input line data.

In a similar manner, in the process for obtaining B line data, which becomes output line data, respective 4 pieces of B line data, which become input line data, are multiplied respectively by the corresponding factors Kb1, Kb2, Kb3, and Kb4, and their sum is obtained, so that the B line data can be made to become the center of taps. Namely, this can be implemented with "B line data in the first line×Kb1+B line data in the second line×Kb2+B line data in the third line×Kb3+B line data in the fourth line×Kb4" in the 4 pieces of B line data, which become input line data.

In this example, Kr1=1/8, Kr2=3/8, Kr3=3/8, and Kr4=1/8 are obtained, and besides, Kb1=1/8, Kb2=3/8, Kb3=3/8, and Kb4=1/8 are obtained.

Next, the flow of such a process is explained by using the configuration shown in FIG. 2. In this example, it is assumed that factors K1 to K4 are the above described factors Kr1 to Kr4 (also the above described factors Kb1 to Kb4) as a factor K input to the selector 23.

The process for obtaining one piece of R line data, which is output line data, from the 4 pieces of R line data, which become input line data, is executed by using the selectors 23, 27, and 31, the multipliers 24 and 25, the adder 26, the line buffer 29, and the factors K1 to K4 in a similar manner as in the flow of the process for R line data, which is explained in the above exemplified case where the pixel number reduction ratio is 1/2 in FIG. 4A, so that the R line data, which becomes output line data, is obtained.

Additionally, the process for obtaining one piece of B line data, which becomes output line data, from the 4 pieces of B line data, which become input line data, is executed by using the selectors 23, 28, and 31, the multipliers 24 and 25, the adder 26, the line buffer 30, and the factors K5 to K8 in a similar manner as in the flow of the process for B line data, which is explained in the above exemplified case where the pixel number reduction ratio is 1/2 in FIG. 4A, so that the B line data, which becomes output line data, is obtained.

Explained up to this point is the process for the vertical direction of captured image data in the case where the pixel number reduction ratio is 1/3.

Next, a process for the vertical direction of captured image data in the case where the pixel number reduction ratio is 1/4 is explained with reference to FIG. 5A.

The example shown in FIG. 5A is an example where a filter size for the LPF process is set to 5 taps, and a pixel number conversion process including a 2-point interpolation process is executed by selecting a combination of pixels, etc. so that the influence of pixel positions to be interpolated becomes suitable, according to the pixel number reduction ratio (reduced image size), which is 1/4, in the vertical direction.

Namely, as shown in FIG. 5A, the process is executed to obtain one piece of R line data, which becomes output line data, from 5 pieces of R line data, which become input line data, in a way such that one piece of R line data is obtained from R line data of R1 to R5, and one piece of R line data is obtained from R line data of R5 to R9. Additionally, the process is executed to obtain one piece of B line data, which becomes output line data, from 5 pieces of B line data, which become input line data, in a way such that one piece of B line data is obtained from B line data of B2 to B6, and one piece of B line data is obtained from B line data of B6 to B10.

However, since the pixel number reduction ratio is 1/even number (1/4), the process for obtaining R line data, which becomes output line data, is executed by obtaining a factor Kr (Kr1, Kr2, Kr3, Kr4, and Kr5) that shifts the R line data upward from the center of taps by 1/4, and by using the factor Kr, in consideration of a pixel position relationship after pixel number conversion. Additionally, the process for obtaining B line data, which becomes output line data, is executed by obtaining a factor Kb (Kb1, Kb2, Kb3, Kb4, and Kb5) that shifts the B line data downward from the center of taps by 1/4, and by using the factor Kb.

Actually, in the process for obtaining R line data, which becomes output line data, respective 5 pieces of R line data, which become input line data, are multiplied respectively by the corresponding factors Kr1, Kr2, Kr3, Kr4, and Kr5, and their sum is obtained, so that the R line data can be shifted upward from the center of taps by 1/4. Namely, this can be implemented with "R line data in the first line×Kr1+R line data in the second line×Kr2+R line data in the third line×Kr3+R line data in the fourth line×Kr4+R line data in the fifth line×Kr5" in the 5 pieces of R line data, which become input line data.

In a similar manner, in the process for obtaining B line data, which becomes output line data, respective 5 pieces of B line data, which become input line data, are multiplied respectively by the corresponding factors Kb1, Kb2, Kb3, Kb4, and Kb5, and their sum is obtained, so that the B line data can be shifted downward from the center of taps by 1/4. Namely, this can be implemented with "B line data in the first line×Kb1+B line data in the second line×Kb2+B line data in the third line×Kb3+B line data in the fourth line×Kb4+B line data in the fifth line×Kb5" in the 5 pieces of B line data, which become input line data.

In this example, Kr1=3/32, Kr2=10/32, Kr3=12/32, Kr4=6/32, and Kr5=1/32 are obtained, and besides, Kb1=1/32, Kb2=6/32, Kb3=12/32, Kb4=10/32, and Kb5=3/32 are obtained.

Next, the flow of such a process is explained by using the configuration shown in FIG. 2. In this example, it is assumed that factors K1 to K5 are the above described factors Kr1 to Kr5, and factors K6 to K10 are the above described factors Kb1 to Kb5 as a factor K input to the selector 23.

The process for obtaining one piece of R line data, which becomes output line data, from the 5 pieces of R line data, which become input line data, is executed by using the selectors 23, 27, and 31, the multipliers 24 and 25, the adder 26, the line buffer 29, and the factors K1 to K5 in a similar manner as in the flow of the process for R line data, which is explained in the above exemplified case where the pixel number reduction ratio is 1/2 in FIG. 4A, so that the R line data, which becomes output line data, is obtained.

Additionally, the process for obtaining one piece of B line data, which becomes output line data, from the 5 pieces of B line data, which become input line data, is executed by using the selectors 23, 28, and 31, the multipliers 24 and 25, the adder 26, the line buffer 30, and the factors K6 to K10 in a similar manner as in the flow of the process for B line data, which is explained in the above exemplified case where the pixel number reduction ratio is 1/2 in FIG. 4A, so that the B line data, which becomes the output line data, is obtained.

Explained up to this point is the process for the vertical direction of captured image data in the case where the pixel number reduction ratio is 1/4.

Next, a process for the vertical direction of captured image data in the case where the pixel number reduction ratio is 1/5 is explained with reference to FIG. 5B.

Figure 5B:
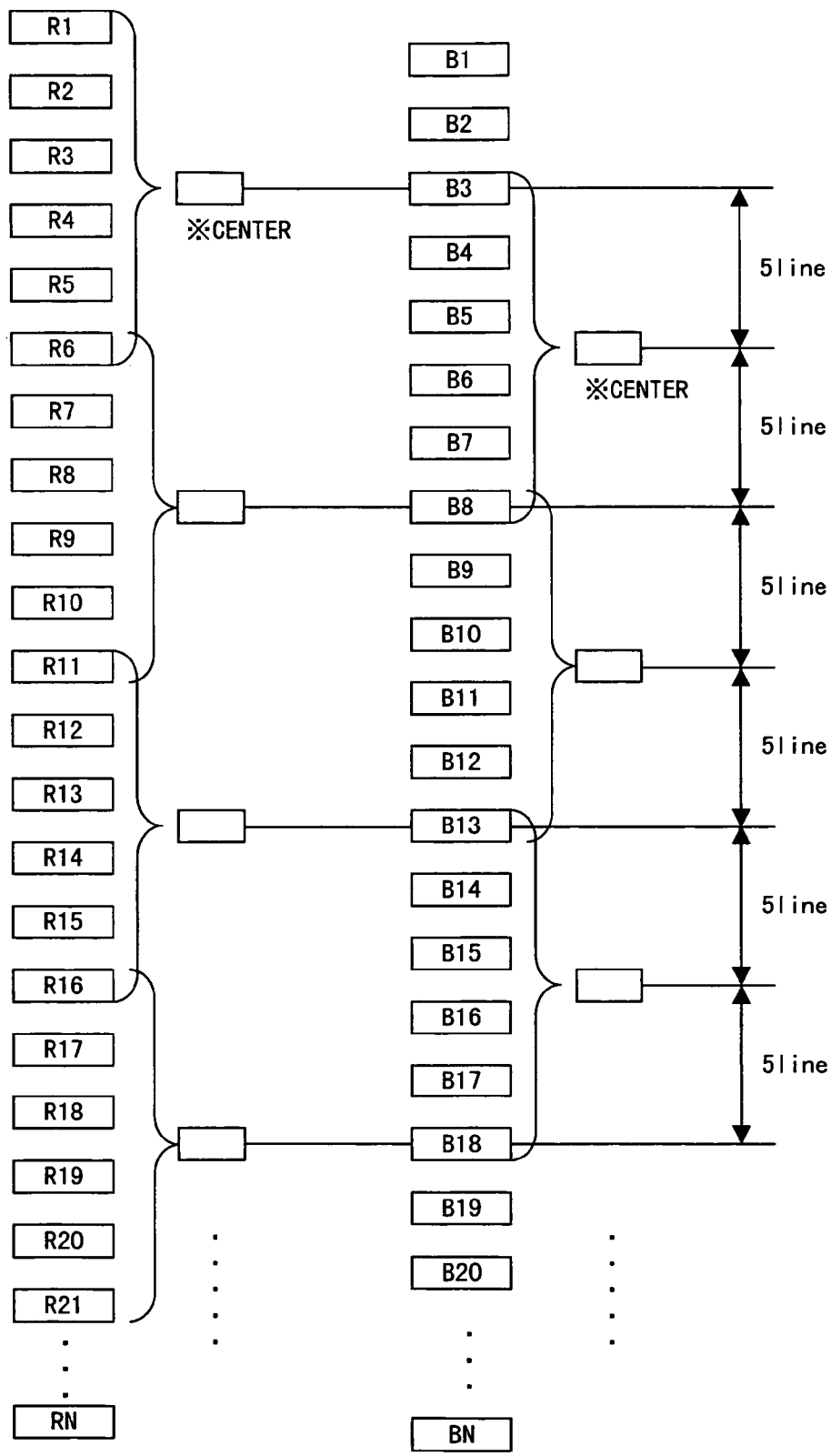

The example shown in FIG. 5B is an example where a filter size for the LPF process is set to 6 taps, and a pixel number conversion process including a 2-point interpolation process is executed by selecting a combination of pixels, etc. so that the influence of pixel positions to be interpolated becomes suitable, according to the pixel number reduction ratio (reduced image size), which is 1/5, in the vertical direction.

Namely, as shown in FIG. 5B, the process is executed to obtain one piece of R line data, which becomes output line data, from 6 pieces of R line data, which become input line data, in a way such that one piece of R line data is obtained from R line data of R1 to R6, and one piece of R line data is obtained from R line data of R6 to R11. Additionally, the process is executed to obtain one piece of B line data, which becomes output line data, from 6 pieces of B line data, which become input line data, in a way such that one piece of B line data is obtained from B line data of B3 to B8, and one piece of B line data is obtained from B line data of B8 to B13.

However, since the pixel number reduction ratio is 1/odd number (1/5), the process for obtaining R line data, which becomes output line data, is executed by obtaining a factor Kr (Kr1, Kr2, Kr3, Kr4, Kr5, and Kr6) that makes the R line data become the center of taps, and by using the factor Kr, in consideration of a pixel position relationship after pixel number conversion. Additionally, the process for obtaining B line data, which becomes output line data, is executed by obtaining a factor Kb (Kb1, Kb2, Kb3, Kb4, Kb5, and Kb6) that makes the B line data become the center of taps, and by using the factor Kb.

Actually, in the process for obtaining R line data, which becomes output line data, respective 6 pieces of R line data, which become input line data, are multiplied respectively by the corresponding factors Kr1, Kr2, Kr3, Kr4, Kr5, and Kr6, and their sum is obtained, so that the R line data can be made to become the center of taps. Namely, this can be implemented with "R line data in the first line×Kr1+R line data in the second line×Kr2+R line data in the third line×Kr3+R line data in the fourth line×Kr4+R line data in the fifth line× Kr5+R line data in the sixth line×Kr6" in the 6 pieces of R line data, which become input line data.

In a similar manner, in the process for obtaining B line data, which becomes output line data, respective 6 pieces of B line data, which become input line data, are multiplied respectively by the corresponding factors Kb1, Kb2, Kb3, Kb4, Kb5, and Kb6, and their sum is obtained, so that the B line data can be made to become the center of taps. Namely, this can be implemented with "B line data in the first line×Kb1+B line data in the second line×Kb2+B line data in the third line×Kb3+B line data in the fourth line×Kb4+B line data in the fifth line×Kb5+B line data in the sixth line×Kb6" in the 6 pieces of B line data, which become input line data.

In this example, Kr1=1/32, Kr2=5/32, Kr3=10/32, Kr4=10/32, Kr5=5/32, and Kr6=1/32 are obtained, and besides, Kb1=1/32, Kb2=5/32, Kb3=10/32, Kb4=10/32, Kb5=5/32, and Kb6=1/32 are obtained.

Next, the flow of such a process is explained by using the configuration shown in FIG. 2. In this example, it is assumed that factors K1 to K6 are the above described factors Kr1 to Kr6, and factors K7 to K12 are the above described factors Kb1 to Kb6 as a factor K input to the selector 23.

The process for obtaining one piece of R line data, which becomes output line data, from the 6 pieces of R line data, which become input line data, is executed by using the selectors 23, 27, and 31, the multipliers 24 and 25, the adder 26, the line buffer 29, and the factors K1 to K6 in a similar manner as in the flow of the process for R line data, which is explained in the above exemplified case where the pixel number reduction ratio is 1/2 in FIG. 4A, so that the R line data, which becomes output line data, is obtained.

Additionally, the process for obtaining one piece of B line data, which becomes output line data, from the 6 pieces of B line data, which become input line data, is executed by using the selectors 23, 28, and 31, the multipliers 24 and 25, the adder 26, the line buffer 30, and the factors K7 to K12 in a similar manner as in the flow of the process for B line data, which is explained in the above exemplified case where the pixel number reduction ratio is 1/2 in FIG. 4A, so that the B line data, which becomes output line data, is obtained.

Explained up to this point is the process for the vertical direction of captured image data in the case where the pixel number reduction ratio is 1/5.

With such processes for the vertical direction of captured image data in the case where the scanning method of the image capturing element 2 is a progressive scanning method, R line data and B line data, for which the process of the preprocessing unit B 5b is executed, are alternately output from the preprocessing unit B 5b, so that image data to be displayed is obtained.

Next, configuration of the preprocessing unit B 5b, and contents of the process executed by the preprocessing unit B 5b in the case where the scanning method of the image capturing element 2 is an interlaced scanning method are explained.

Figure 6:
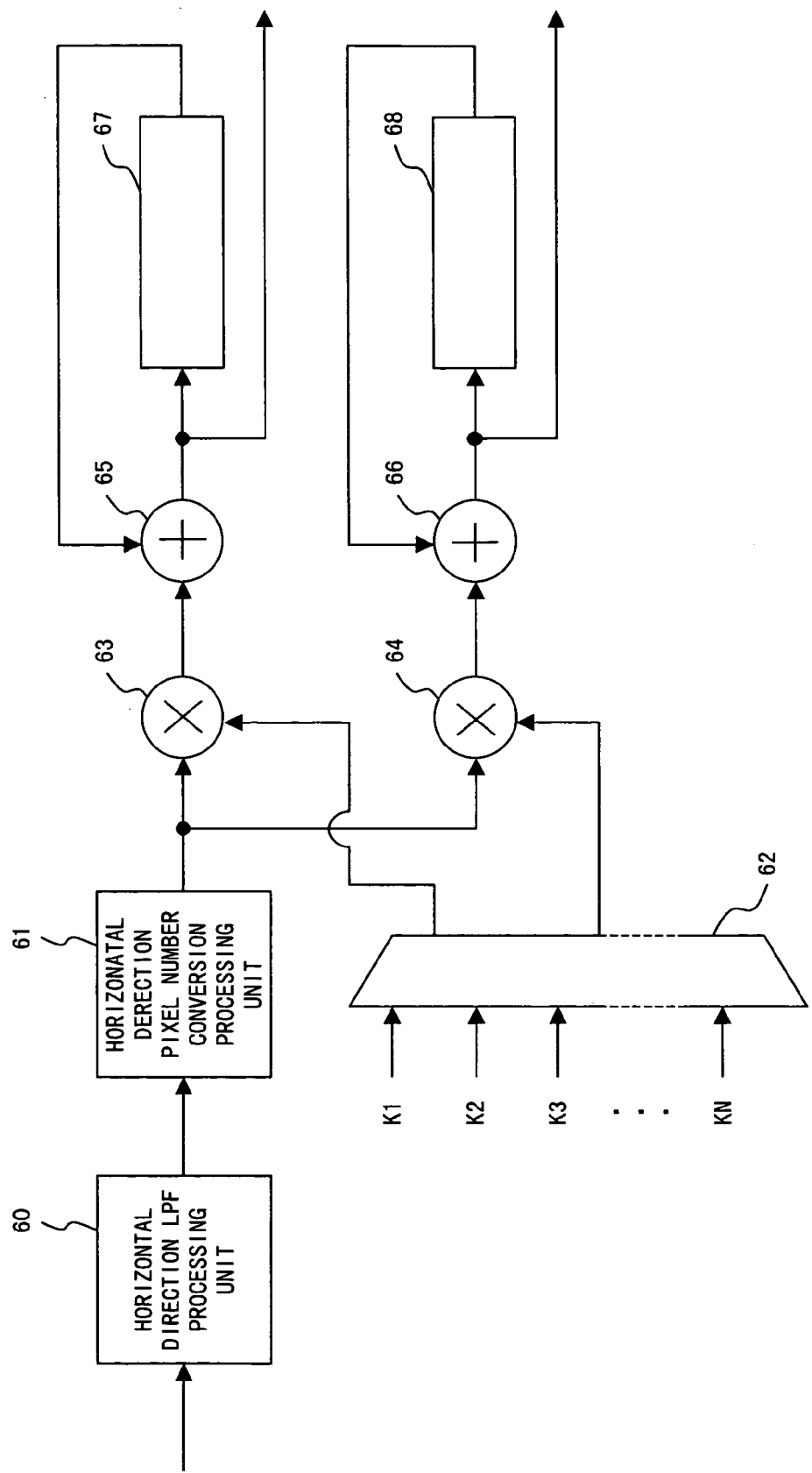
FIG. 6 shows another example of the configuration of a preprocessing unit executing a filter process, and a pixel number conversion process that includes an interpolation process considering a pixel position relationship after pixel number conversion.

FIG. 6 exemplifies the configuration of the preprocessing unit B 5b.

In this figure, a horizontal direction LPF processing unit 60 and a horizontal direction pixel number converting unit 61 are configured to execute a process for the horizontal direction of captured image data, and have configurations similar to those of the horizontal direction LPF processing unit 21 and the horizontal direction pixel number conversion processing unit 22, which are shown in FIG. 2.

Additionally, a selector 62, two multipliers 63 and 64, two adders 65 and 66, and two line buffers 67 and 68 are configured to execute a process for the vertical direction of captured image data. Also in the pixel number conversion process executed by this configuration, its reduction ratio is set to 1/integer, so that the number of configuring line buffers can be suppressed to two, and the number of components and components cost can be reduced. Also factors K1, K2, K3, ..., KN, which are input to the selector 62, are as described above.

Next, contents of the process executed by the preprocessing unit B 5b having the above described configuration are explained.

Firstly, a process for the horizontal direction of captured image data is explained.

In the process for the horizontal direction of captured image data, a process similar to that explained with reference to FIG. 3 is executed. However, the scanning method of the image capturing element 2 is an interlaced scanning method in this example. Therefore, as line data input to the horizontal direction LPF processing unit 60, line data in odd-numbered fields (assumed to be R line data in this example) are sequentially input, and then, line data in even-numbered fields (assumed to be B line data in this example) are sequentially input. Accordingly, R line data and then B line data, for which the process for the horizontal direction of captured image data is executed, are sequentially output from the horizontal direction pixel number converting unit 61.

Next, processes for the vertical direction of captured image data are explained with reference to FIGS. 7A, 7B, 8A, and 8B.

FIGS. 7A, 7B, 8A, and 8B respectively show examples of a process for the vertical direction of captured image data in the cases where the pixel number reduction ratio is respectively 1/2, 1/3, 1/4, and 1/5.

Firstly, the process for the vertical direction of captured image data in the case where the pixel number reduction ratio is 1/2 is explained with reference to FIG. 7A.

The example shown in FIG. 7A is an example where a filter size for the LPF process is set to 4 taps, and a pixel number conversion process including a 2-point interpolation process is executed by selecting a combination of pixels, etc. so that the influence of pixel positions to be interpolated becomes suitable, according to the pixel number reduction ratio (reduced image size), which is 1/2, in the vertical direction.

Namely, as shown in FIG. 7A, the process is executed to obtain one piece of R line data, which becomes output line data, from 4 pieces of R line data, which become input data, in a way such that one piece of R line data is obtained from R line data of R1 to R4, and one piece of R line data is obtained from R line data of R3 to R6. Additionally, the process is executed to obtain one piece of B line data, which becomes output line data, from 4 pieces of B line data, which become input line data, in a way such that one piece of B line data is obtained from B line data of B1 to B4, and one piece of line data is obtained from B line data of B3 to B6.

However, since the pixel number reduction ratio is 1/even number (1/2), the process for obtaining R line data, which becomes output line data, is executed by obtaining a factor Kr (Kr1, Kr2, Kr3, and Kr4) that shifts the R line data upward from the center of taps by 1/4, and by using the factor Kr, in consideration of a pixel position relationship after pixel number conversion. Additionally, the process for obtaining B line data, which becomes output line data, is executed by obtaining a factor Kb (Kb1, Kb2, Kb3, and Kb4) that shifts the B line data downward from the center of taps by 1/4, and by using the factor Kb.

Actually, in the process for obtaining R line data, which becomes output line data, respective 4 pieces of R line data, which become input line data, are multiplied respectively by the corresponding factors Kr1, Kr2, Kr3, and Kr4, and their sum is obtained, so that the R line data can be shifted upward from the center of taps by 1/4. Namely, this can be implemented with "R line data in the first line×Kr1+R line data in the second line×Kr2+R line data in the third line×Kr3+R line data in the fourth line×Kr4" in the 4 pieces of R line data, which become input line data.

In a similar manner, in the process for obtaining B line data, which becomes output line data, respective 4 pieces of B line data, which become input line data, are multiplied respectively by the corresponding factors Kb1, Kb2, Kb3, and Kb4, and their sum is obtained, so that the B line data can be shifted downward from the center of taps by 1/4. Namely, this can be implemented with "B line data in the first line×Kb1+B line data in the second line×Kb2+B line data in the third line×Kb3+B line data in the fourth line× Kb4" in the 4 pieces of B line data, which become input line data.

In this example, Kr1=3/16, Kr2=7/16, Kr3=5/16, and Kr4=1/16 are obtained, and besides, Kb1=1/16, Kb2=5/16, Kb3=7/16, and Kb4=3/16 are obtained.

Next, the flow of such a process is explained by using the configuration shown in FIG. 6. In this example, it is assumed that factors K1 to K4 are the above described factors Kr1 to Kr4, and factors K5 to K8 are the above described factors Kb1 to Kb4 as a factor K input to the selector 62.

As described above, R line data and then B line data, for which the process for the horizontal direction of captured image data is executed, are sequentially output from the horizontal direction pixel number conversion processing unit 22.

Firstly, the line data of R1 is multiplied by K1, which is output from the selector 62, by the multiplier 63, and the multiplied data is stored in the line buffer 67 via the adder 65 unchanged.

The line data of succeeding R2 is multiplied by K2, which is output from the selector 62, by the multiplier 63, the line data stored in the line buffer 67 is added by the adder 65, and the resultant data is stored in the line buffer 67.

The line data of succeeding R3 is multiplied by K3, which is output from the selector 62, by the multiplier 63, the line data stored in the line buffer 67 is added by the adder 65, and the resultant data is stored in the line buffer 67. In the meantime, the line data of R3 is multiplied by K1, which is output from the selector 62, by the multiplier 64, and the multiplied data is stored in the line buffer 68 via the adder 66 unchanged.

The line data of succeeding R4 is multiplied by K4, which is output from the selector 62, by the multiplier 63, the line data stored in the line buffer 67 is added by the adder 65, and the resultant data is stored in the buffer memory 9. In this way, one piece of R line data, which is obtained from the line data of R1 to R4, is stored in the buffer memory 9. In the meantime, the line data of R4 is multiplied by K2, which is output from the selector 62, by the multiplier 64, the line data stored in the line buffer 68 is added by the adder 66, and the resultant data is stored in the line buffer 68.

Subsequently, the line buffers 67 and 68 are alternately used in a similar manner for each process for obtaining one piece of R line data, which becomes output line data, so that all pieces of R line data, which become output line data, are obtained.

Also for the succeeding B line data, the line buffers 67 and 68 are alternately used in a similar manner for each process for obtaining one piece of B line data, which becomes output line data, so that all pieces of B line data, which become output line data, are obtained. However, this process for B line data is executed by using the factors K5 to K8.

Explained up to this point is the process for the vertical direction of captured image data in the case where the pixel number reduction ratio is 1/2.

Next, a process for the vertical direction of captured image data in the case where the pixel number reduction ratio is 1/3 is explained with reference to FIG. 7B.

Figure 7B:
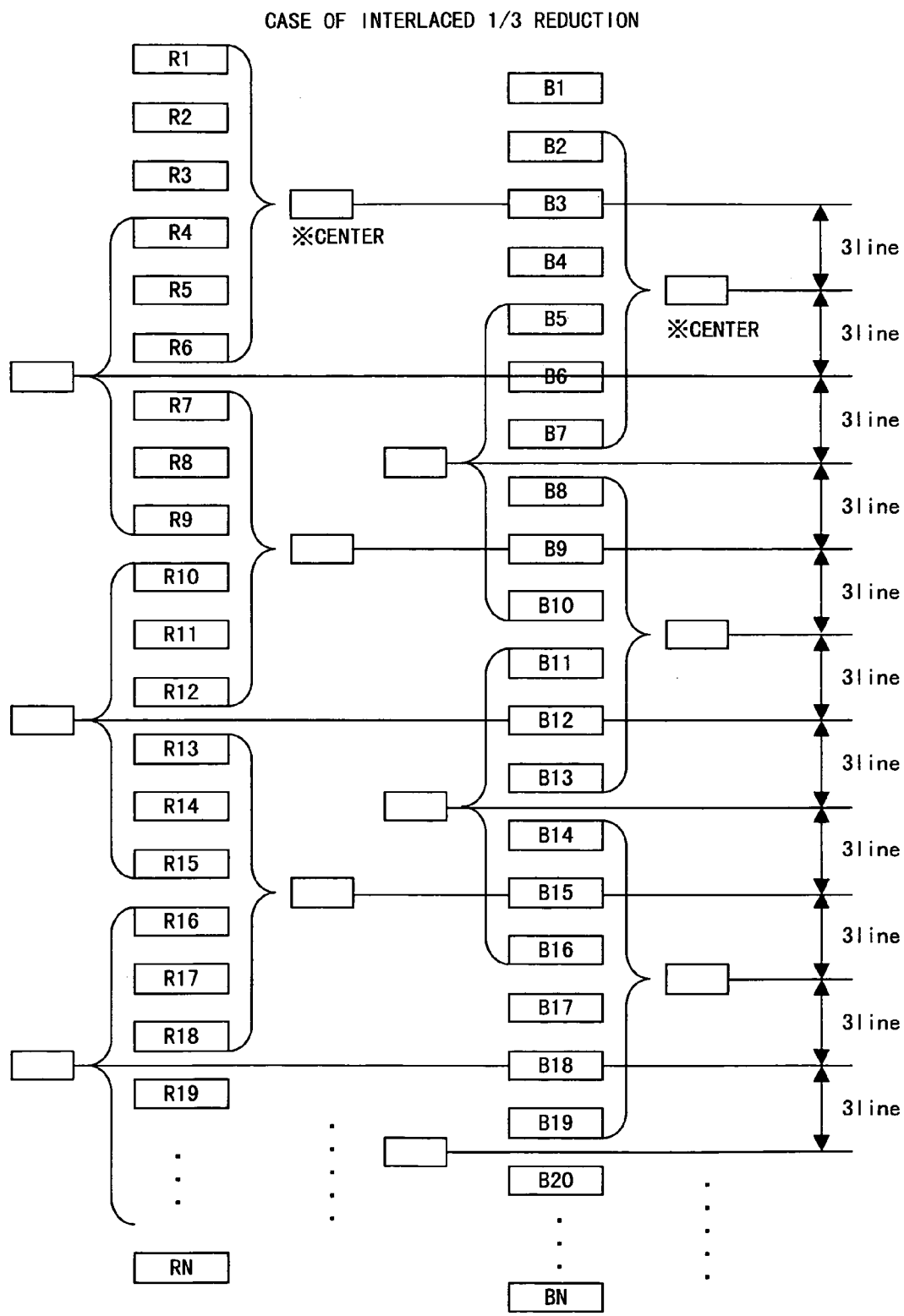
FIG. 7B shows another example of a process for the vertical direction of captured image data in the case where a pixel number reduction ratio is 1/3.

The example shown in FIG. 7B is an example where a filter size for the LPF process is set to 6 taps, and a pixel number conversion process including a 2-point interpolation process is executed by selecting a combination of pixels, etc. so that the influence of pixel positions to be interpolated becomes suitable, according to the pixel number reduction ratio (reduced image size), which is 1/3, in the vertical direction.

Namely, as shown in FIG. 7B, the process is executed to obtain one piece of R line data, which becomes output line data, from 6 pieces of R line data, which become input line data, in a way such that one piece of R line data is obtained from R line data of R1 to R6, and one piece of R line data is obtained from R line data of R4 to R9. Additionally, the process is executed to obtain one piece of B line data, which becomes output line data, from 6 pieces of B line data, which become input line data, in a way such that one piece of B line data is obtained from B line data of B2 to B7, and one piece of B line data is obtained from B line data of B5 to B10.

However, since the pixel number reduction ratio is 1/odd number (1/3), the process for obtaining R line data, which becomes output line data, is executed by obtaining a factor Kr (Kr1, Kr2, Kr3, Kr4, Kr5, and Kr6) that makes the R line data become the center of taps, and by using the factor Kr, in consideration of a pixel position relationship after pixel number conversion. Additionally, the process for obtaining B line data, which becomes output line data, is executed by obtaining a factor Kb (Kb1, Kb2, Kb3, Kb4, Kb5, and Kb6) that makes the B line data become the center of taps, and by using the factor Kb.

Actually, in the process for obtaining R line data, which becomes output line data, respective 6 pieces of R line data, which become input line data, are multiplied respectively by the corresponding factors Kr1, Kr2, Kr3, Kr4, Kr5, and Kr6, and their sum is obtained, so that the line data can be made to become the center of taps.

In a similar manner, in the process for obtaining B line data, which becomes output line data, respective 6 pieces of B line data, which become input line data, are multiplied respectively by the corresponding factors Kb1, Kb2, Kb3, Kb4, Kb5, and Kb6, and their sum is obtained, so that the B line data can be made to become the center of taps.

In this example, Kr1=1/32, Kr2=5/32, Kr3=10/32, Kr4=10/32, Kr5=5/32, and Kr6=1/32 are obtained, and besides, Kb1=1/32, Kb2=5/32, Kb3=10/32, Kb4=10/32, Kb5=5/32, and Kb6=1/32 are obtained.

Next, the flow of such a process is explained by using the configuration shown in FIG. 6. In this example, it is assumed that factors K1 to K6 are the above described factors Kr1 to Kr6 (also the factors Kb1 to Kb6) as a factor K input to the selector 62.

For the line data of R1 to R6, which become input line data, the process is executed by using the multiplier 63, the adder 65, the line buffer 67, and the factors K1 to K6 in a similar manner as in the flow of the process for the line data of R1 to R4, which is explained in the above exemplified case where the pixel number reduction ratio is 1/2 in FIG. 7A, so that the R line data, which become output line data, is obtained.

Additionally, for the line data of R4 to R9, which become input line data, the process is executed by using the multiplier 64, the adder 66, the line buffer 68, and the factors K1 to K6 in a similar manner as in the flow of the process for the line data of R3 to R6, which is explained in the above exemplified case where the pixel number reduction ratio is 1/2 in FIG. 7A, so that the R line data, which becomes output line data, is obtained.

Subsequently, the line buffers 67 and 68 are alternately used in a similar manner for each process for obtaining one piece of R line data, which becomes output line data, so that all pieces of R line data, which become output line data, are obtained.

Also for the succeeding B line data, the process is executed in a similar manner, so that all pieces of B line data, which become output line data, are obtained.

Explained up to this point is the process for the vertical direction of captured image data in the case where the pixel number reduction ratio is 1/3.

Next, a process for the vertical direction of captured image data in the case where the pixel number reduction ratio is 1/4 is explained with reference to FIG. 8A.

The example shown in FIG. 8A is an example where a filter size for the LPF process is set to 8 taps, and a pixel number conversion process including a 2-point interpolation process is executed by selecting a combination of pixels, etc. so that the influence of pixel positions to be interpolated becomes suitable, according to the pixel number reduction ratio (reduced image size), which is 1/4, in the vertical direction.

Namely, as shown in FIG. 8A, the process is executed to obtain one piece of R line data, which becomes output line data, from 8 pieces of R line data, which become input line data, in a way such that one piece of R line data is obtained from R line data of R1 to R8, and one piece of R line data is obtained from R line data of R5 to R12. Additionally, the process is executed to obtain one pieces of B line data, which becomes output line data, from 8 pieces of B line data, which become input line data, in a way such that one piece of B line data is obtained from B line data of B2 to B9, and one piece of B line data is obtained from B line data of B6 to B13.

However, since the pixel number reduction ratio is 1/even number (1/4), the process for obtaining R line data, which becomes output line data, is executed by obtaining a factor Kr (Kr1, Kr2, Kr3, Kr4, Kr5, Kr6, Kr7, and Kr8) that shifts the R line data upward from the center of taps by 1/4, and by using the factor Kr, in consideration of a pixel position relationship after pixel number conversion. Additionally, the process for obtaining B line data, which becomes output line data, is executed by obtaining a factor Kb (Kb1, Kb2, Kb3, Kb4, Kb5, Kb6, Kb7, and Kb8) that shifts the B line data downward from the center of taps by 1/4, and by using the factor Kb.

Actually, in the process for obtaining R line data, which becomes output line data, respective 8 pieces of R line data, which become input line data, are multiplied respectively by the corresponding factors Kr1, Kr2, Kr3, Kr4, Kr5, Kr6, Kr7, and Kr8, and their sum is obtained, so that the R line data can be shifted upward from the center of taps by 1/4. Namely, this can be implemented with "R line data in the first line×Kr1+R line data in the second line×Kr2+R line data in the third line×Kr3+R line data in the fourth line×Kr4+R line data in the fifth line×Kr5+R line data in the sixth line×Kr6+R line data in the seventh line×Kr7+ and R line data in the eighth line×Kr8" in the 8 pieces of R line data, which become input line data.

In a similar manner, in the process for obtaining B line data, which becomes output line data, respective 8 pieces of B line data, which become input line data, are multiplied respectively by the corresponding factors Kb1, Kb2, Kb3, Kb4, Kb5, Kb6, Kb7 and Kb8, and their sum is obtained, so that the B line data can be shifted downward from the center of taps by 1/4. Namely, this can be implemented with "B line data in the first line×Kb1+B line data in the second line×Kb2+B line data in the third line×Kb3+B line data in the fourth line×Kb4+B line data in the fifth line×Kb5+B line data in the sixth line×Kb6+B line data in the seventh line×Kb7+ and B line data in the eighth line×Kb8" in the 8 pieces of B line data, which become input line data.

Next, the flow of such a process is explained by using the configuration shown in FIG. 6. In this example, it is assumed that factors K1 to K8 are the above described factors Kr1 to Kr8, and factors K9 to K16 are the above described factors Kb1 to Kb8 as a factor K input to the selector 62.

For the line data of R1 to R8, which become input line data, the process is executed by using the multiplier 63, the adder 65, the line buffer 67, and the factors K1 to K8 in a similar manner as in the flow of the process for the line data of R1 to R4, which is explained in the above exemplified case where the pixel number reduction ratio is 1/2 in FIG. 7A, so that the R line data, which becomes output line data, is obtained.

Additionally, for the line data of R5 to R12, which become input line data, the process is executed by using the multiplier 64, the adder 66, the line buffer 68, and the factors K1 to K8 in a similar manner as in the flow of the process for the line data of R3 to R6, which is explained in the above exemplified case where the pixel number reduction ratio is 1/2 in FIG. 7A, so that the R line data, which become output line data, is obtained.

Subsequently, the line buffers 67 and 68 are alternately used in a similar manner for each process for obtaining one piece of R line data, which becomes output line data, so that all pieces of R line data, which become output line data, are obtained.

Also for the succeeding B line data, the process is executed in a similar manner, so that all pieces of B line data, which become output line data, are obtained. However, this process for B line data is executed by using the factors K9 to K18.

Explained up to this point is the process for the vertical direction of captured image data in the case where the pixel number reduction ratio is 1/4.

Next, a process for the vertical direction of captured image data in the case where the pixel number reduction ratio is 1/5 is explained with reference to FIG. 8B.

Figure 8B:
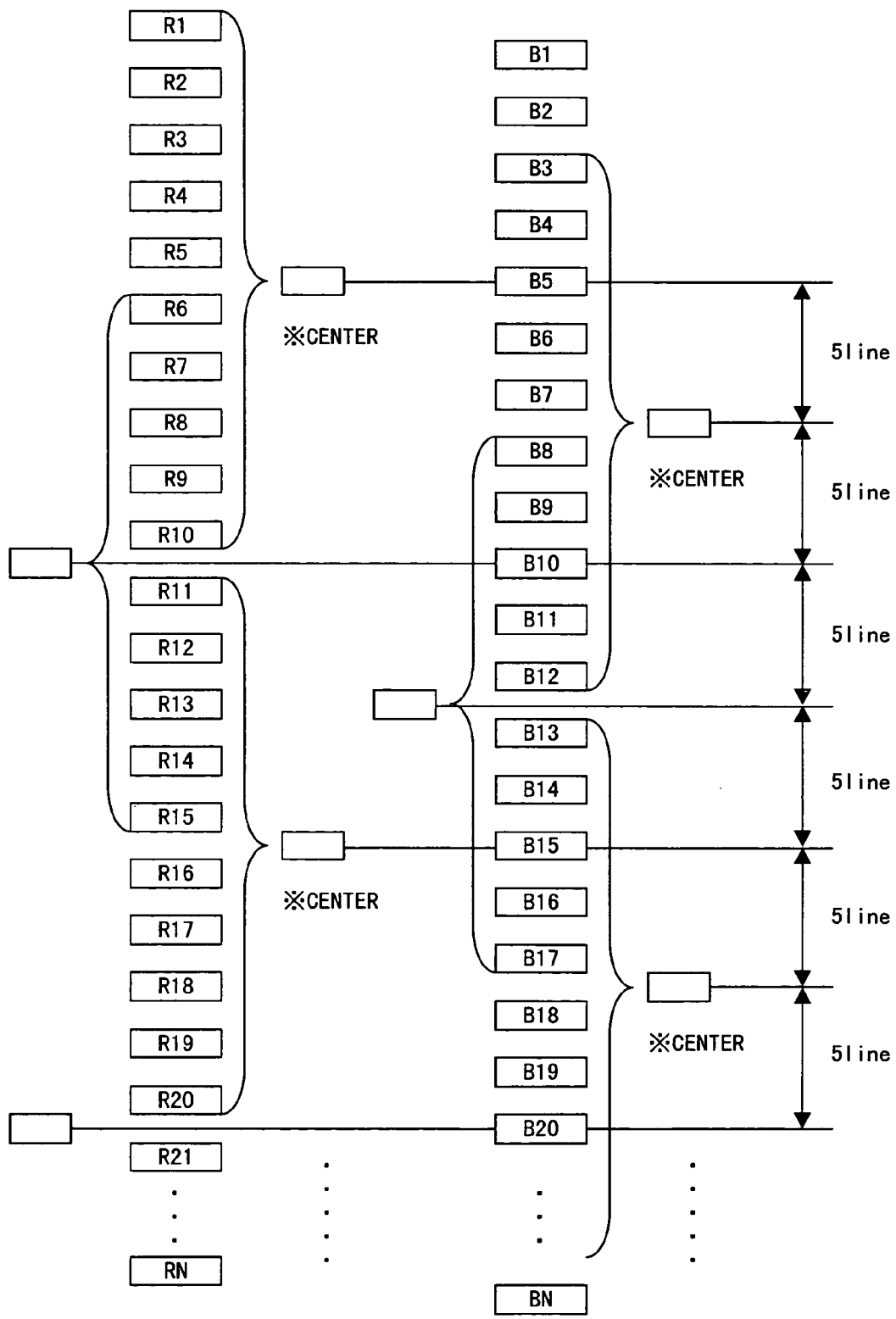
FIG. 8B shows another example of a process for the vertical direction of captured image data in the case where a pixel number reduction ratio is 1/5.

The example shown in FIG. 8B is an example where a filter size for the LPF process is set to 10 taps, and a pixel number conversion process including a 2-point interpolation process is executed by selecting a combination of pixels, etc. so that the influence of pixel positions to be interpolated becomes suitable, according to the pixel number reduction ratio (reduced image size), which is 1/5, in the vertical direction.

Namely, as shown in FIG. 8B, the process is executed to obtain one piece of R line data, which becomes output line data, from 10 pieces of R line data, which become input line data, in a way such that one piece of R line data is obtained from R line data of R1 to R10, and one piece of R line data is obtained from R line data of R6 to R15. Additionally, the process is executed to obtain one piece of B line data, which becomes output line data, from 10 pieces of B line data, which become input line data, in a way such that one piece of B line data is obtained from B line data of B3 to B12, and one piece of B line data is obtained from B line data of B8 to B17.

However, since the pixel number reduction ratio is 1/odd number (1/5), the process for obtaining R line data, which becomes output line data, is executed by obtaining a factor Kr (Kr1, Kr2, Kr3, Kr4, Kr5, Kr6, Kr7, Kr8, Kr9, and Kr10) that makes the R line data become the center of taps, and by using the factor Kr, in consideration of a pixel position relationship after pixel number conversion. Additionally, the process for obtaining B line data, which becomes output line data, is executed by obtaining a factor Kb (Kb1, Kb2, Kb3, Kb4, Kb5, Kb6, Kb7, Kb8, Kb9, and Kb10) that makes the B line data become the center of taps, and by using the factor Kb.

Actually, in the process for obtaining R line data, which becomes output line data, respective 10 pieces of R line data, which become input line data, are multiplied respectively by the corresponding factors Kr1, Kr2, Kr3, Kr4, Kr5, Kr6, Kr7, Kr8, Kr9, and Kr10, and their sum is obtained, so that the R line data can be made to become the center of taps. Namely, this can be implemented with "R line data in the first line×Kr1+R line data in the second line×Kr2+R line data in the third line×Kr3+R line data in the fourth line×Kr4+R line data in the fifth line×Kr5+R line data in the sixth line×Kr6+R line data in the seventh line×Kr7+R line data in the eighth line×Kr8+R line data in the ninth line×Kr9+R line data in the tenth line×Kr10" in the 10 pieces of R line data, which become input line data.

In a similar manner, in the process for obtaining B line data, which becomes output line data, respective 10 pieces of B line data, which become input line data, are multiplied respectively by the corresponding factors Kb1, Kb2, Kb3, Kb4, Kb5, Kb6, Kb7, Kb8, Kb9, and Kb10, and their sum is obtained, so that the B line data can be made to become the center of taps. Namely, this can be implemented with "B line data in the first line×Kb1+B line data in the second line×Kb2+B line data in the third line×Kb3+B line data in the fourth line×Kb4+B line data in the fifth line×Kb5+B line data in the sixth line×Kb6+B line data in the seventh line×Kb7+B line data in the eighth line×Kb8+B line data in the ninth line×Kb9+B line data in the tenth line×Kb10" in the 10 pieces of B line data, which become input line data.

Next, the flow of such a process is explained by using the configuration shown in FIG. 6. In this example, it is assumed that factors K1 to K10 are the above described factors Kr1 to Kr10, and factors K11 to K20 are the above described factors Kb1 to Kb10 as a factor K input to the selector 62.

For the line data of R1 to R10, which become input line data, the process is executed by using the multiplier 63, the adder 65, the line buffer 67, and the factors K1 to K10 in a similar manner as in the flow of the process for the line data of R1 to R4, which is explained in the above exemplified case where the pixel number reduction ratio is 1/2 in FIG. 7A, so that the R line data, which becomes output line data, is obtained.

Additionally, for the line data of R6 to R15, which become input line data, the process is executed by using the multiplier 64, the adder 66, the line buffer 68, and the factors K1 to K10 in a similar manner as in the flow of the process for the line data of R3 to R6, which is explained in the above exemplified case where the pixel number reduction ratio is 1/2 in FIG. 7A, so that the R line data, which becomes output line data, is obtained.

Subsequently, the line buffers 67 and 68 are alternately used in a similar manner for each process for obtaining one piece of R line data, which becomes output line data, so that all pieces of R line data, which become output line data, are obtained.

Also for the succeeding B line data, the process is executed in a similar manner, so that all pieces of B line data, which become output line data, are obtained. However, the process for B line data is executed by using the factors K11 to K20.

Explained up to this point is the process for the vertical direction of captured image data in the case where the pixel number reduction ratio is 1/5.

With such processes for the vertical direction of captured image data in the case where the scanning method of the image capturing element 2 is an interlaced scanning method, R line data and then B line data, for which the process of the preprocessing unit B 5b is executed, are sequentially output from the preprocessing unit B 5b, so that image data to be displayed is obtained.

Note that redundant factors may be used as one factor K in order to reduce factors K used in the above described processes for the vertical direction of captured image data.

Furthermore, the above processes for the vertical direction of captured image data are explained by taking the cases where the pixel number reduction ratio is 1/2, 1/3, 1/4, and 1/5 as examples. However, the processes may be executed by applying other pixel number reduction ratios (1/integer).

Still further, in this preferred embodiment, the processing unit 5c of the image processing unit 5 executes the process for generating index image data from image data to be displayed. However, a configuration for executing this process may be newly provided.

FIG. 9 exemplifies the configuration of the image processing unit 5 in such a case.

As shown in this figure, the image processing unit 5 newly comprises a preprocessing unit C 5d as a configuration for executing the process for generating index image data from image data to be displayed. Captured image data output from the A/D unit 4 is input not only to the preprocessing units A 5a and B 5b, but also to the preprocessing unit C 5d.

The preprocessing unit C 5d, which is allowed to execute a process in parallel with the preprocess executed by the preprocessing unit A 5a, executes processes such as a process for generating index image data, whose data amount is smaller than image data to be displayed, from captured image data. In the process executed by the above described preprocessing unit C 5d, index image data may be generated, for example, by executing a process similar to that executed by the above described preprocessing unit B 5b. This index image data is recorded to the buffer memory 9.

Additionally, in this preferred embodiment, the pixel number conversion process that includes the interpolation process considering a pixel position relationship after pixel number conversion, which is executed by the horizontal direction pixel number conversion processing unit 22 (or 61), may be implemented by a synchronization process and a sampling process.

A horizontal direction pixel number converting unit executing such a process is explained with reference to FIGS. 10A, 10B, and 10C.

FIG. 10A exemplifies the configuration of the horizontal direction pixel number converting unit.

As shown in this figure, the horizontal direction pixel number converting unit 71 is configured by a synchronization processing unit 71a and a sampling processing unit 71b. The synchronization processing unit 71a executes a process for synchronizing output line data of the horizontal direction LPF processing unit 21 (or 60), whereas the sampling processing unit 71b executes a process for sampling the synchronized line data.

FIG. 10B explains the synchronization process executed by the synchronization processing unit 71a. An LPF image in an upper stage of FIG. 10B indicates the input line data of the synchronization processing unit 71a (the output line data of the horizontal LPF processing unit 21 (or 60)), whereas a synchronized image in a lower stage of FIG. 10B indicates the output line data of the synchronization processing unit 71a. FIG. 10B is explained by taking line data composed of R and G as an example for convenience of explanation. However, the process is executed also for line data composed of G and B in a similar manner (the same is applied to FIG. 10C).

As shown in FIG. 10B, in the synchronization process, synchronization is performed by obtaining a 1:3 internally dividing point, and a 3:1 internally dividing point of adjacent two pixels in the same color of the input line data of the synchronization processing unit 71a, so that the output line data of the synchronization processing unit 71a is obtained.

Namely, the output line data in the case of R pixels is obtained by $$R(n)a=\{3\times R(n)+R(n+1)\}/4$$

$$R(n)b=\{R(n)+3\times R(n+1)\}/4$$

where n is an integer that is not negative. Also the output data in the case of G pixels is obtained in a similar manner.

FIG. 10C explains the sampling process executed by the sampling processing unit 71b. A synchronized image in an upper stage of FIG. 10C indicates the input line data of the sampling processing unit 71b (the output line data of the synchronization processing unit 71a), whereas a sampled image in a lower stage of FIG. 10C indicates the output line data of the sample processing unit 71b. Note that FIG. 10C is an example in the case where a pixel number reduction ratio is set to 1/3.

As shown in FIG. 10C, sampling is performed according to the pixel number reduction ratio, which is 1/3, so that the sampled image is obtained.

Also with the above described configuration of the horizontal direction pixel number converting unit, the pixel number conversion process that includes the interpolation process considering a pixel position relationship after pixel number conversion can be implemented.

Additionally, in this preferred embodiment, the configuration of the preprocessing unit B 5b, and the process executed by the preprocessing unit B 5b are explained respectively with reference to FIGS. 2 and 6, and FIGS. 4A, 4B, 5A, 5B, 7A, 7B, 8A, and 8B. However, if reductions in the number of components, etc. are not considered, the configuration and the process are not limited to these implementations. Other configurations and processes may be applicable.

Furthermore, in this preferred embodiment, the primary color filter is applied as a filter used for the image capturing element 2. However, a filter of a complementary color type (complementary color filter) may be applied, and the processes are similarly executed in such a case.

As described above, the electronic camera apparatus according to the present invention and the image processing method thereof are explained in detail. However, the present invention is not limited to the above described preferred embodiment. Various types of improvements and changes may be made within a scope that does not deviate from the gist of the present invention as a matter of course.

As described above in detail, according to the present invention, a shot image can be quickly verified and displayed immediately after shooting.

What is claimed is:

1. An electronic camera apparatus, comprising:
    an A/D converting unit obtaining captured image data by A/D converting an image signal that is obtained by capturing an image;
    a first image data processing unit executing a preprocess for generating image data to be recorded from the captured image data;
    a second image data processing unit, which is allowed to execute a process in parallel with the preprocess executed by said first image data processing unit, executing a preprocess that includes a filter process and a pixel number conversion process in order to generate image data to be displayed, whose data amount is smaller than the image data to be recorded, from the captured image data;
    a storing unit temporarily storing, via a common transmission path, both image data, which is obtained by said first image data processing unit and for which the preprocess for generating image data to be recorded is executed, and image data, which is obtained by said second image data processing unit and for which the preprocess for generating image data to be displayed is executed; and a third image data processing unit executing an image process for making recording and a display, which are related to the captured image data, based on the image data to be recorded and the image data to be displayed, which are stored in said storing unit.

2. The electronic camera apparatus according to claim 1, wherein said second image data processing unit comprises
a horizontal direction filter unit executing a filter process for a horizontal direction, which is an input order of the captured image data, for the captured image data,
a horizontal direction pixel number converting unit executing an interpolation process for reducing an amount of image data in the horizontal direction for image data for which the filter process is executed by said horizontal direction filter unit,
a vertical direction filter unit executing a filter process for a vertical direction for image data for which the interpolation process is executed by said horizontal direction pixel number converting unit, and
a vertical direction pixel number converting unit executing an interpolation process for reducing an amount of image data in a vertical direction for image data for which the filter process is executed by said vertical direction filter unit.

3. The electronic camera apparatus according to claim 1, wherein the common transmission path is a bus.

4. The electronic camera apparatus according to claim 1, wherein the storing unit is of a single memory type.

5. The electronic camera apparatus according to claim 4, wherein the single memory type is dynamic random access memory.

6. An electronic camera apparatus, comprising:
an A/D converting unit obtaining captured image data by A/D converting an image signal that is obtained by capturing an image;
a first image data processing unit executing a preprocess for generating image data to be recorded from the captured image data;
a second image data processing unit, which is allowed to execute a process in parallel with the preprocess executed by said first image data processing unit, executing a preprocess that includes a filter process and a pixel number conversion process in order to generate image data to be displayed, whose data amount is smaller than the image data to be recorded, from the captured image data;
a storing unit temporarily storing both image data, which is obtained by said first image data processing unit and for which the preprocess for generating image data to be recorded is executed, and image data, which is obtained by said second image data processing unit and for which the preprocess for generating image data to be displayed is executed; and
a third image data processing unit executing an image process for making recording and a display, which are related to the captured image data, based on the image data to be recorded and the image data to be displayed, which are stored in said storing unit, wherein said second image data processing unit comprises
a horizontal direction filter unit executing a filter process for a horizontal direction, which is an input order of the captured image data, for the captured image data,
a horizontal direction pixel number converting unit executing an interpolation process for reducing an amount of image data in the horizontal direction for image data for which the filter process is executed by said horizontal direction filter unit,
a multiplier multiplying the image data, for which the interpolation process is executed by said horizontal direction pixel number converting unit, by factors for a filter process for a vertical direction, and an interpolation process for reducing an amount of image data in the vertical direction,
a line buffer temporarily storing the image data obtained as a result of multiplication made by said multiplier in units of lines, and
a vertical direction pixel number converting unit executing the interpolation process for reducing the amount of image data in the vertical direction based on the image data stored in said line buffer and image data in a next line, which is multiplied by said multiplier.

7. The electronic camera apparatus according to claim 6, wherein

The pixel number conversion process is configured to perform interpolation by selecting a combination so that pixel positions for which pixel number conversion is performed become suitable according to a reduction in an amount of image data.

8. The electronic camera apparatus according to claim 6, wherein the filter process and the pixel number conversion process are configured as an LPF (Low Pass Filter) process, and a pixel number conversion process including an interpolation process considering a pixel position relationship after pixel number conversion, for a horizontal direction of the captured image data, and as an LPF process and a pixel number conversion process, which use a line buffer, the pixel number conversion process including an interpolation process considering a pixel position relationship after pixel number conversion, for a vertical direction of the captured image data.

9. The electronic camera apparatus according to claim 6, wherein:
said line buffer comprises a line buffer different for each line data in a same color filter arrangement; and
said vertical direction pixel number converting unit executes an interpolation process for reducing an amount of image data in the vertical direction for each line data in the same color filter arrangement.

10. The electronic camera apparatus according to claim 6, wherein said third image data processing unit is configured to execute an image data compression process as an image process for recording.

11. The electronic camera apparatus according to claim 6, further comprising
a fourth image data processing unit, which is allowed to execute a process in parallel with the preprocess executed by said first image data processing unit, generating index image data, whose data amount is smaller than the image data to be displayed, from the captured image data.

12. The electronic camera apparatus according to claim 6, wherein
said third image data processing unit is configured to generate index image data whose data amount is smaller than the image data to be displayed based on the image data to be displayed, which is stored in said storing unit.

13. The electronic camera apparatus according to claim 6, wherein
the image signal is obtained by capturing an image with a progressive scanning method or an interlaced scanning method.

14. An electronic camera apparatus, comprising:
an A/D converting unit obtaining captured image data by A/D converting an image signal that is obtained by capturing an image;
a first image data processing unit executing a preprocess for generating image data to be recorded from the captured image data;
a second image data processing unit, which is allowed to execute a process in parallel with the preprocess executed by said first image data processing unit, executing a preprocess that includes a filter process and a pixel number conversion process in order to generate image data to be displayed, whose data amount is smaller than the image data to be recorded, from the captured image data;
a storing unit temporarily storing both image data, which is obtained by said first image data processing unit and for which the preprocess for generating image data to be recorded is executed, and image data, which is obtained by said second image data processing unit and for which the preprocess for generating image data to be displayed is executed; and
a third image data processing unit executing an image process for making recording and a display, which are related to the captured image data, based on the image data to be recorded and the image data to be displayed, which are stored in said storing unit,
wherein the filter process and the pixel number conversion process are configured as an LPF (Low Pass Filter) process, and a pixel number conversion process including an interpolation process considering a pixel position relationship after pixel number conversion, for a horizontal direction of the captured image data, and as an LPF process and a pixel number conversion process, which use a line buffer, the pixel number conversion process including an interpolation process considering a pixel position relationship after pixel number conversion, for a vertical direction of the captured image data, and
wherein, if the preprocess by said second image data processing unit is executed for captured image data obtained by capturing an image with a progressive scanning method, an LPF process and a pixel number conversion process that includes an interpolation process considering a pixel position relationship after pixel number conversion are executed by using at least two line buffers for the vertical direction of the captured image data.

15. An image processing method for use in an electronic camera apparatus, comprising:
obtaining captured image data by A/D converting an image signal that is obtained by capturing an image;
executing a first preprocess for generating image data to be recorded from the captured image data;
executing a second preprocess, which is allowed to be executed in parallel with the first preprocess and includes a filter process and a pixel number conversion process in order to generate image data to be displayed, whose data amount is smaller than the image data to be recorded, from the captured image data;
temporarily storing, in a storing unit, both image data for which the first preprocess for generating image data to be recorded is executed, and image data for which the second preprocess for generating image data to be displayed is executed; and
executing an image process for making recording and a display, which are related to the captured image data, based on the image data to be recorded and the image data to be displayed, which are stored in said storing unit,
wherein said second preprocess comprises:
executing a filter process for a horizontal direction, which is an input order of the captured image data, for the captured image data,
executing an interpolation process for reducing an amount of image data in the horizontal direction for image data for which the filter process is executed,
multiplying the image data, for which the interpolation process is executed, by factors for a filter process for a vertical direction, and an interpolation process for reducing an amount of image data in the vertical direction,
temporarily storing, in a line buffer, the image data obtained as a result of multiplication in units of lines, and
executing the interpolation process for reducing the amount of image data in the vertical direction based on the image data stored in said line buffer and image data in a next line which is multiplied.

16. An image processing method for use in an electronic camera apparatus, comprising:
obtaining captured image data by A/D converting an image signal that is obtained by capturing an image;
executing a first preprocess for generating image data to be recorded from the captured image data;
executing a second preprocess, which is allowed to be executed in parallel with the first preprocess and includes a filter process and a pixel number conversion process in order to generate image data to be displayed, whose data amount is smaller than the image data to be recorded, from the captured image data;
temporarily storing, in a storing unit, both image data for which the first preprocess for generating image data to be recorded is executed, and image data for which the second preprocess for generating image data to be displayed is executed; and
executing an image process for making recording and a display, which are related to the captured image data, based on the image data to be recorded and the image data to be displayed, which are stored in said storing unit,
wherein the filter process and the pixel number conversion process are configured as a low pass filter process, and a pixel number conversion process including an interpolation process considering a pixel position relationship after pixel number conversion, for a horizontal direction of the captured image data, and as a low pass filter process and a pixel number conversion process, which use a line buffer, the pixel number conversion process including an interpolation process considering a pixel position relationship after pixel number conversion, for a vertical direction of the captured image data, and wherein, if the second preprocess is executed for captured image data obtained by capturing an image with a progressive scanning method, a low pass filter process and a pixel number conversion process that includes an interpolation process considering a pixel position relationship after pixel number conversion are executed by using at least two line buffers for the vertical direction of the captured image data.

* * * * *